(12) United States Patent
Nordstrom et al.

(10) Patent No.: US 12,475,410 B2
(45) Date of Patent: *Nov. 18, 2025

(54) LOCATION-BASED ACTIVITY COMPUTER SYSTEMS

(71) Applicant: Eventyr Outdoors, Inc.

(72) Inventors: Craig Allen Nordstrom, Maple Grove, MN (US); Daniel James Ellyson, Deer Park, WI (US); Joshua Aaron Smith, Maple Grove, MN (US)

(73) Assignee: Eventyr Outdoors, Inc., Plymouth, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/826,576

(22) Filed: Sep. 6, 2024

(65) Prior Publication Data

US 2025/0053888 A1 Feb. 13, 2025

Related U.S. Application Data

(63) Continuation of application No. 18/136,062, filed on Apr. 18, 2023, now Pat. No. 12,112,281, which is a
(Continued)

(51) Int. Cl.
*G06Q 10/02* (2012.01)
*G06F 16/9032* (2019.01)
(Continued)

(52) U.S. Cl.
CPC ....... *G06Q 10/02* (2013.01); *G06F 16/90328* (2019.01); *G06F 16/9035* (2019.01);
(Continued)

(58) Field of Classification Search
CPC ..................................................... G06Q 10/02
See application file for complete search history.

(56) References Cited

U.S. PATENT DOCUMENTS 9,858,538 B1 1/2018 Johansson
10,152,680 B1 12/2018 Myrick
(Continued)

OTHER PUBLICATIONS

Fishingforfunmn.org, ("Schedule a Trip" Accessed via Web archive screengrab of Mar. 31, 2016; available at: https:/Aveb.archive.org/web/20160331062802/nttp://fishingforfunmn.org/schedule-a-trip/, last accessed Jul. 14, 2025 (Year: 2016).*
(Continued)

*Primary Examiner* — Emmett K. Walsh
(74) *Attorney, Agent, or Firm* — Fish & Richardson P.C.

(57) ABSTRACT

In one implementation, a computer-implemented method includes receiving, at a computer system, a request for outdoor adventures that satisfy one or more criteria; accessing a centralized data repository of outdoor adventures that are provided by a plurality of different guides; identifying, by the computer system, one or more outdoor adventures based on a comparison of the one or more criteria to data associated with the outdoor adventures; generating code that includes information for the one or more outdoor adventures, the code being generated for execution or interpretation on the client computing device; and transmitting the code to the client computing device, wherein the client computing device is programmed to automatically execute or interpret the code upon receipt so as to present a graphical user interface presenting the one or more outdoor adventures and a selectable feature to reserve at least a portion of the one or more adventures.

16 Claims, 30 Drawing Sheets

Related U.S. Application Data continuation of application No. 17/376,475, filed on Jul. 15, 2021, now Pat. No. 11,657,336, which is a continuation of application No. 16/303,956, filed as application No. PCT/US2017/033599 on May 19, 2017, now Pat. No. 11,068,805.

(60) Provisional application No. 62/340,802, filed on May 24, 2016.

(51) Int. Cl.
*G06F 16/9035* (2019.01)
*G06F 16/9038* (2019.01)
*G06F 16/909* (2019.01)
*G06Q 30/0251* (2023.01)

(52) U.S. Cl.
CPC ........ *G06F 16/9038* (2019.01); *G06F 16/909* (2019.01); *G06Q 30/0255* (2013.01)

(56) References Cited

U.S. PATENT DOCUMENTS

| | | |
|---|---|---|
| 2006/0190309 A1 | 8/2006 | Ewart |
| 2008/0201227 A1 | 8/2008 | Bakewell |
| 2010/0131366 A1* | 5/2010 | Gibson .................. G06Q 30/06 705/14.58 |
| 2010/0191550 A1 | 7/2010 | Hutson |
| 2013/0024203 A1 | 1/2013 | Flores |
| 2013/0304522 A1 | 11/2013 | Cundle |
| 2014/0149152 A1 | 5/2014 | Nickolson |
| 2015/0120767 A1* | 4/2015 | Skeen .................. G06F 16/335 707/754 |
| 2015/0169630 A1 | 6/2015 | Shynar |
| 2015/0339694 A1 | 11/2015 | Robbin |
| 2016/0019472 A1 | 1/2016 | Javit |
| 2016/0092954 A1 | 3/2016 | Bassett |
| 2016/0239737 A1 | 8/2016 | Jiang |
| 2017/0169035 A1* | 6/2017 | Rodgers ............ G06F 16/24578 |

OTHER PUBLICATIONS

Fishingforfunnnn.org [online], "Schedule a Trip" available on or before Mar. 31, 2016, via Internet Archive: Wayback Machine URL <https://web.archive.org/web/20160331062802/http://fishingforfunnnn.org/schedule-a-trip/> retrieved on Jan. 19, 2021, URL <http://fishingforfunnnn.org/schedule-a-trip>, 3 pages.

PCT International Preliminary Report on Patentability in PCT Appln. No. PCT/US2017/033599, dated Nov. 27, 2018, 6 pages.

PCT International Search Report and Written Opinion in PCT Appln. No. PCT/US2017/033599, dated Aug. 15, 2017, 7 pages.

* cited by examiner

FIG. 2B

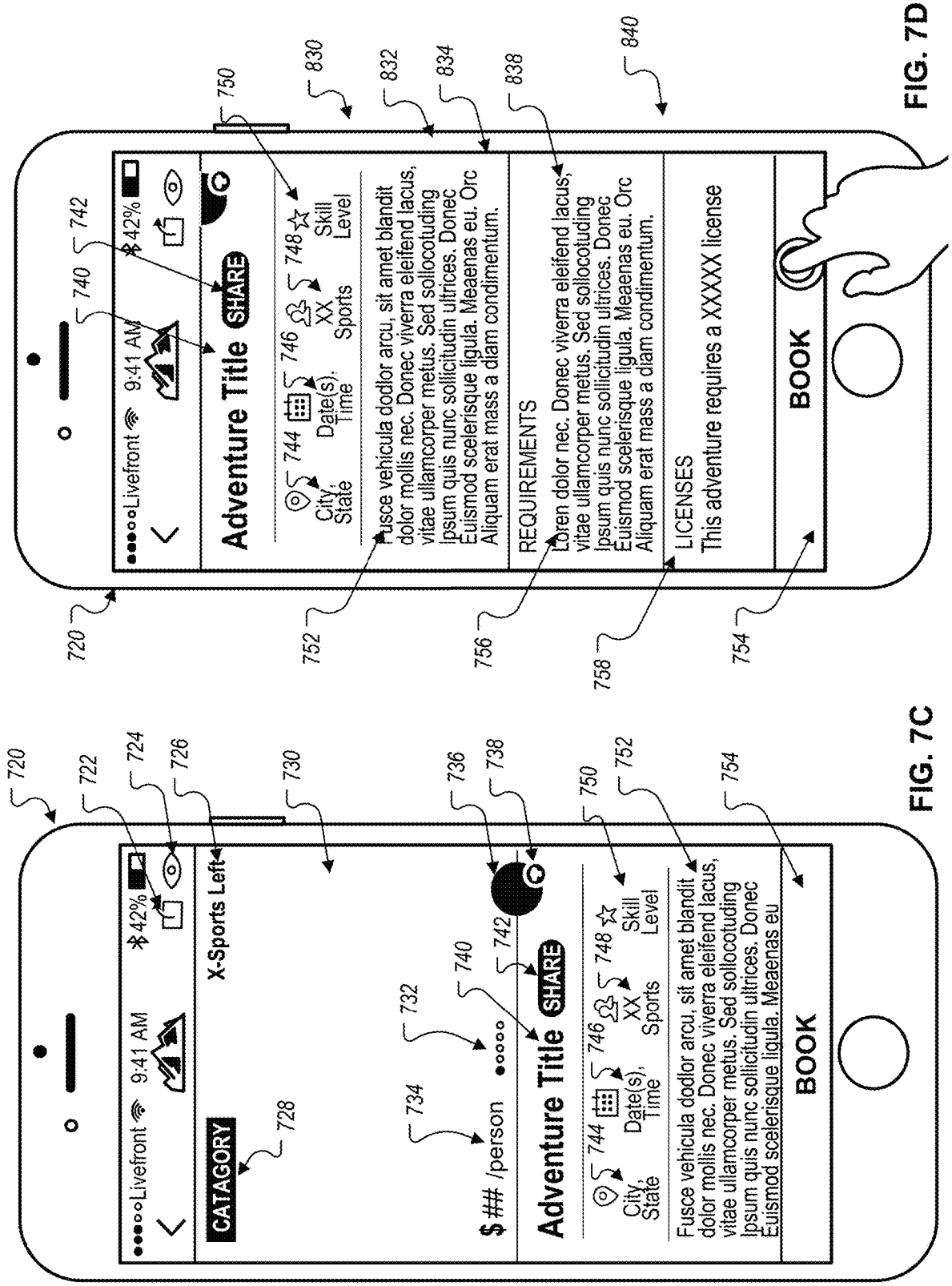

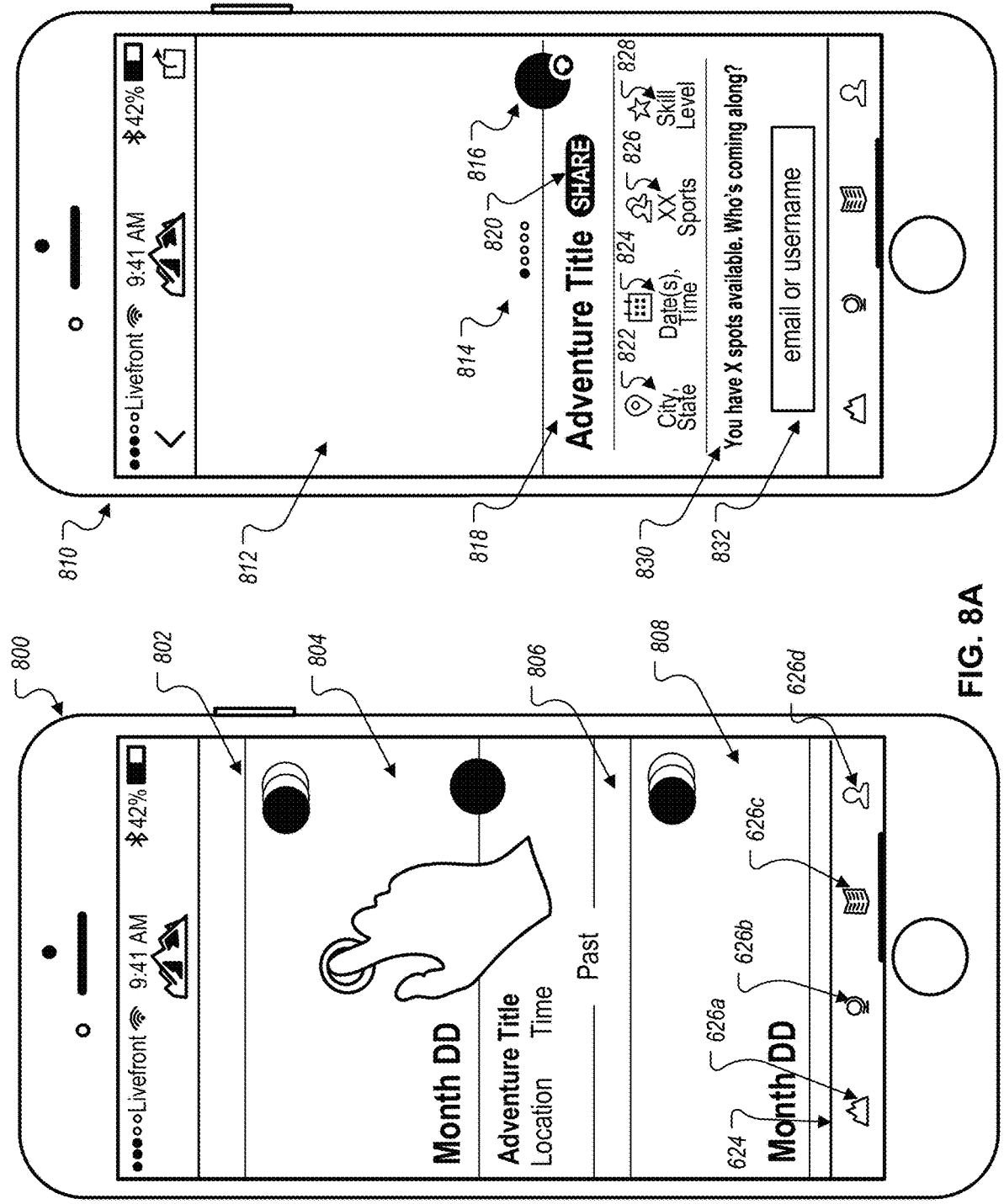

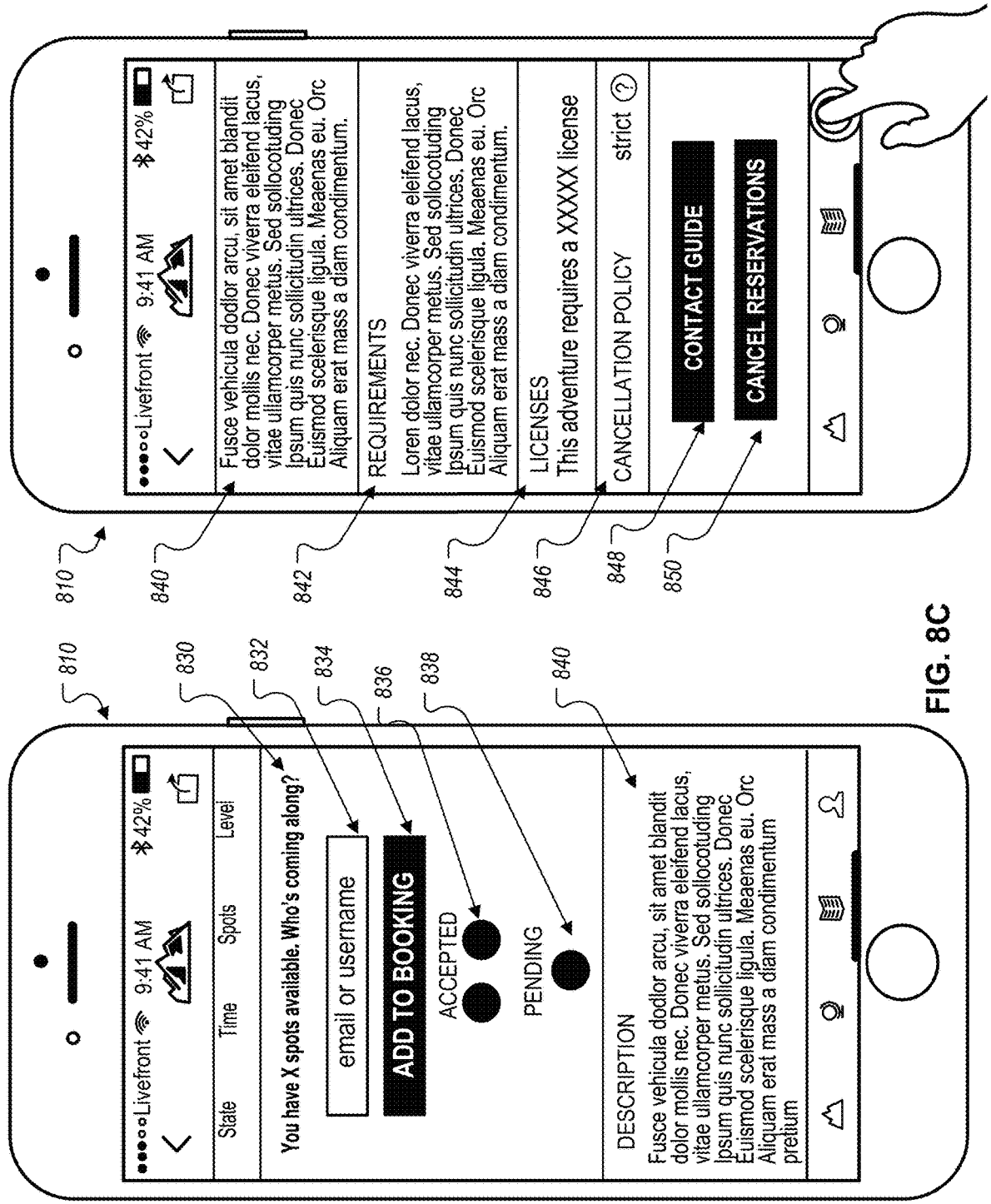

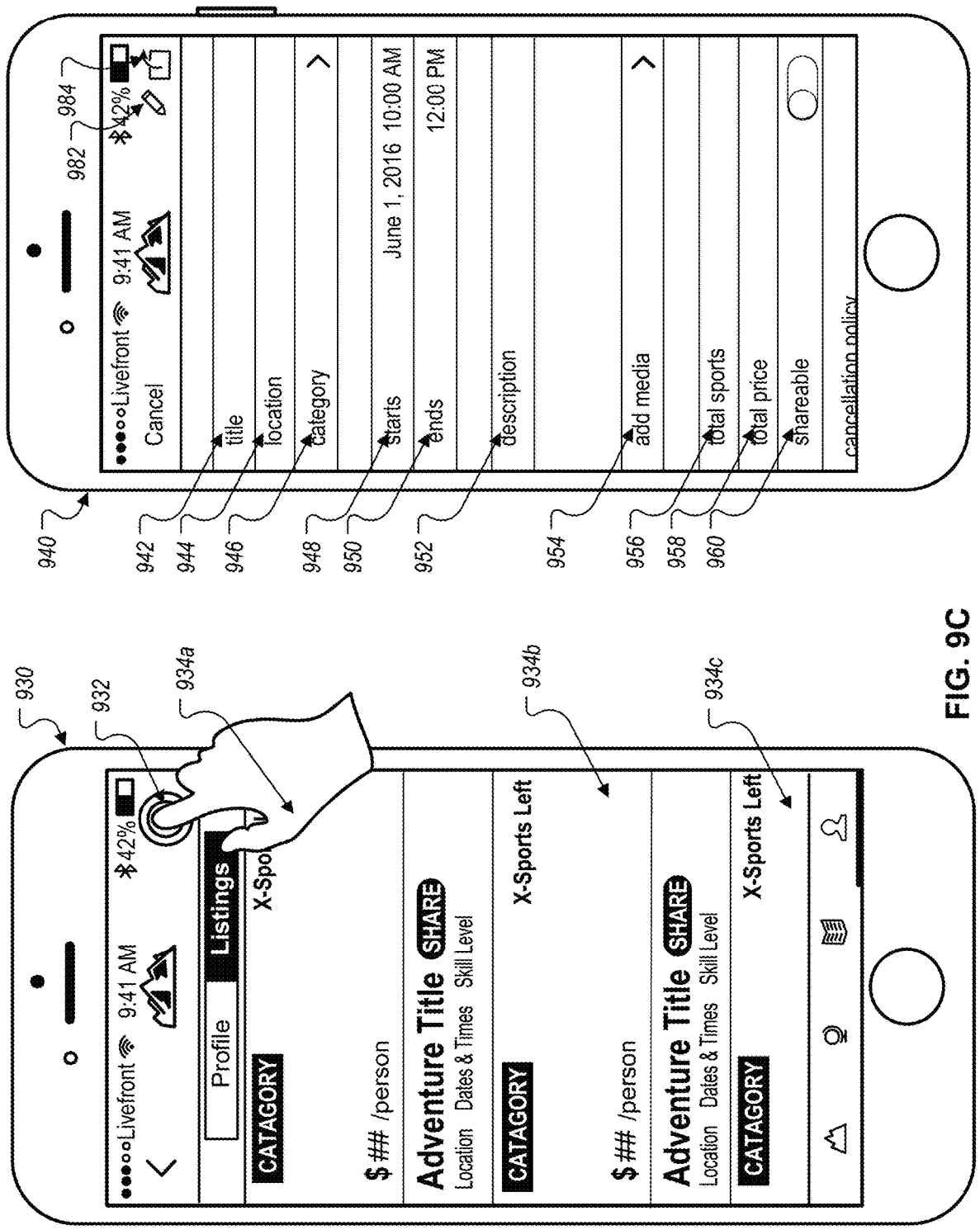

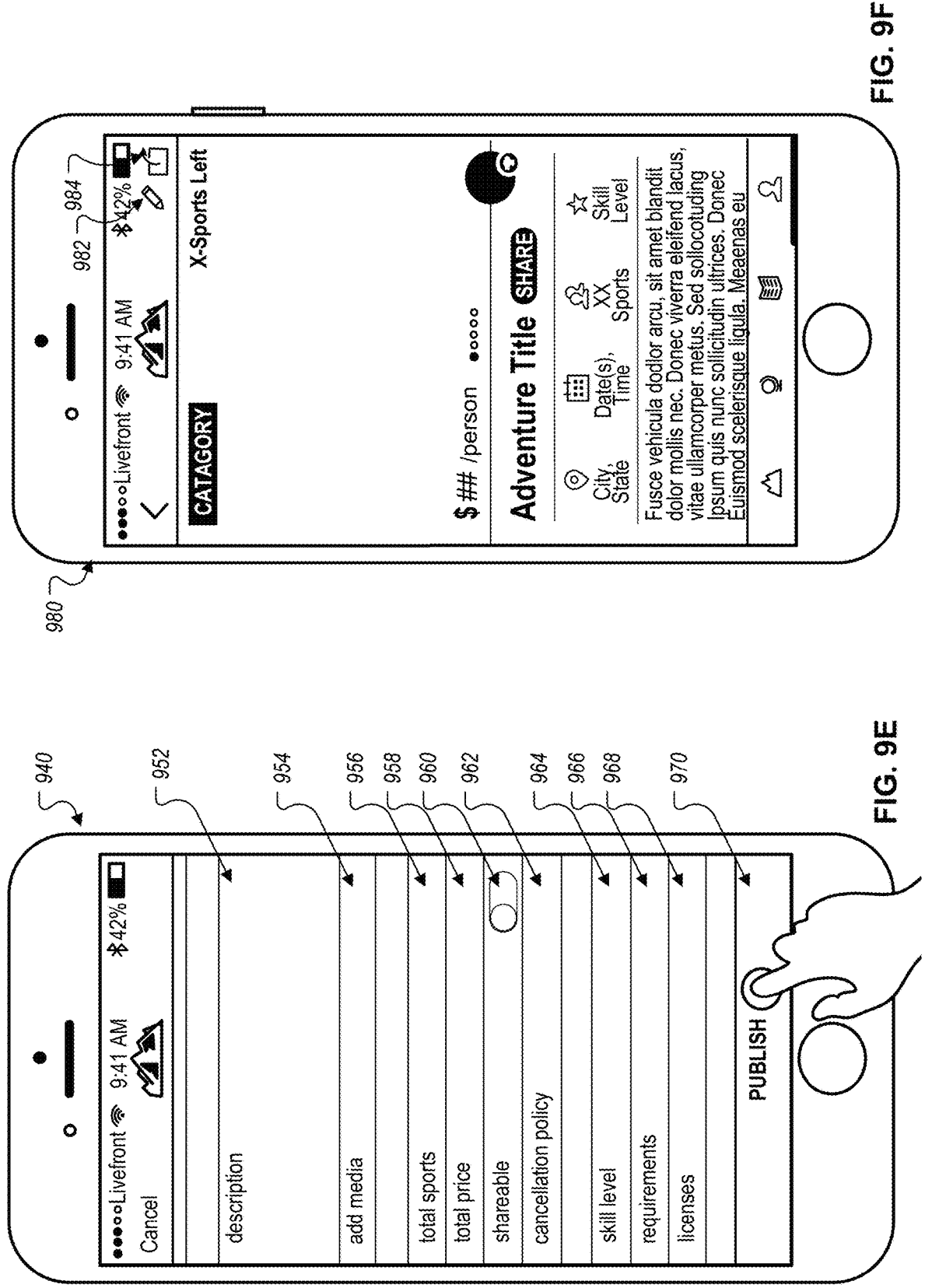

LOCATION-BASED ACTIVITY COMPUTER SYSTEMS

CROSS-REFERENCE TO RELATED APPLICATIONS

This application is a continuation of U.S. application Ser. No. 18/136,062, filed on Apr. 18, 2023, which is a continuation of U.S. application Ser. No. 17/376,475, filed on Jul. 15, 2021 (now U.S. Pat. No. 11,657,336), which is a continuation of U.S. application Ser. No. 16/303,956, filed on Nov. 21, 2018 (now U.S. Pat. No. 11,068,805), which is a National Stage application under 35 U.S.C. § 371 of International Application No. PCT/US2017/033599, having an International Filing Date of May 19, 2017, which claims the benefit of U.S. Provisional Application Ser. No. 62/340,802, filed on May 24, 2016. The disclosures of the prior applications are considered part of (and are incorporated by referenced in) the disclosure of this application.

TECHNICAL FIELD

This document generally describes technology related to improvements for connecting users with sources of outdoor guide opportunities or other activities based on the location information of the user and other factors.

BACKGROUND

Outdoor guides can be experts in one or more outdoor activities, like hunting or fishing, and provide guiding services for clients related to their areas of expertise. In general, guide services can include a variety of different activities, such as instructing beginners or enthusiasts on one or more outdoor skills (e.g., casting techniques for fly fishing), introducing users to particular outdoor locations (e.g., bringing users to a particularly good hunting location), and/or guiding users on an outdoor experience (e.g., taking users on a hunting trip). Typically, an expert guide is hired by users on a per trip or per experience basis, which can last anywhere from a couple hours to a couple weeks (or longer).

Users have located guides in a number of ways, such as through word of mouth referrals, recommendations through hospitality services (e.g., concierge services), online advertising, and internet searches. For example, an outdoor guide may have an individual website to describe his/her services and may also purchase online advertising on social networking and internet search platforms. Prospective and existing users can locate and connect with this outdoor guide in a variety of ways, such as through entering the uniform resource locator (URL) for the guide's website into a web browser, conducting an internet search for the guide (which can link back to the guide's website), and/or selecting an online advertisement for the guide (which can also link back to the guide's website).

SUMMARY

This document generally describes technology for an improved platform that optionally combines social media aspects with activity sourcing capabilities for connecting users with sources of outdoor guide opportunities or other activities based on the location information of the user and other factors (e.g., time of day, date, available or required equipment, range of costs, cost-sharing bid opportunities, stored user preferences, historical reviews from previous users, a user-specific input level of adventure/risk, or the like). In particular embodiments, the improved platform can be implemented in a manner that provides a location-based guide-pairing computer system configured to pair users seeking a physical activity (e.g., either a specific, predetermined activity or a spontaneous, previously unplanned or unknown activity) with a variety of filtered sources for such activity. Such computer systems can use internet-based technology to assist users in identifying, connecting with, and reserving an activity from a set of selectable adventures (e.g., outdoor guide trips, outdoor guided experiences, marine-based activities, excursions, ecotours, sporting activities, personal training, and other events) with appropriate guides across varied fields of interest and varied geographic regions (including outdoor activities and indoor activities). For example, users can identify, reserve, and pay for outdoor opportunities that are offered by outdoor guides through a centralized computer system (e.g., server system, cloud-based computer system), which can include connecting users with guides and outdoor opportunities that are located near a user's current location or near a location that the user will be visiting at a future date. Guides and guide opportunities can additionally and/or alternatively be identified based on other search criteria (e.g., type of opportunity, date, time, guide reviews, guide ratings, required gear, price) that may be explicitly and/or implicitly determined based on user input through a client device, such as a mobile device (e.g., smartphone, tablet computing device), laptop, and/or desktop computer.

In some implementations, specifically programmed mobile applications (e.g., accessed via a smartphone or tablet) and web applications (e.g., accessed via a browser of a computing device) to communicate with such a centralized computer system can be provided to, installed on, and executed/interpreted by client computing devices used by guides and users. Mobile applications (referred to herein as "mobile apps") and web applications can provide features to generate, identify, reserve, and process payments for outdoor adventures or other activities (e.g., trips, outdoor experiences) through, for example, securely accessing specific hardware components on the client computing devices, like location services (e.g., global positioning system (GPS) components, WiFi positioning components), audio and visual inputs (e.g., cameras, microphones), volatile and non-volatile storage locations (e.g., local storage devices, memory), output mechanisms (e.g., touchscreen display, speaker), and/or input mechanisms (e.g., touchscreen, buttons, motion/orientation sensors). For example, a mobile app that is installed on a guide's computing device can include input features through which a guide can geotag one or more locations that are relevant to a proposed guide trip (e.g., meetup location, route to be travelled on the trip, recommended gear retailer location), select or take photos/videos that depict the experience for a trip, input equipment information and images (e.g., identifying what equipment is provided by the guide or what equipment is recommend to be brought by the user, and/or access a local calendar on the guide's device to identify possible times for the guide trip. In another example, a mobile app installed on a user's device, which may be the same as or different from a mobile app installed on a guide's device, can include input features through which a user can provide permission for the current geolocation of the mobile device to be provided to and used by the centralized computer system to identify nearby guided adventures, designate particular types of outdoor adventures (e.g., trips, outdoor experiences) that are of interest, and/or select and secure registration for particular adventures. Additional and/or alternative mobile app features are also possible.

In one implementation, a computer-implemented method includes receiving, at a computer system and from a client computing device, a request for outdoor adventures that satisfy one or more criteria; accessing, by the computer system, a centralized data repository of outdoor adventures that are provided by a plurality of different guides; identifying, by the computer system, one or more outdoor adventures based on a comparison of the one or more criteria to data associated with the outdoor adventures; generating, by the computer system, code that includes information for the one or more outdoor adventures, the code being generated for execution or interpretation on the client computing device; and transmitting, by the computer system, the code to the client computing device, wherein the client computing device is programmed to automatically execute or interpret the code upon receipt so as to present a graphical user interface presenting the one or more outdoor adventures and a selectable feature to reserve at least a portion of the one or more adventures.

Such a computer-implemented method can optionally include one or more of the following features. The computer-implemented method can further include receiving, at the computer system, a reservation request to reserve a particular outdoor adventure from among the one or more adventures, the reservation request being provided automatically by the client computing device based on selection of the selectable feature; and reserving, by the computer system, the particular outdoor adventure for a user logged-in to the client computing device in response to receiving the reservation request. The computer-implemented method can further include determining, by the computer system, that the reservation request is to reserve a spot on the particular outdoor adventure as a shared adventure with other users; and identifying, by the computer system, a user-designated amount that the user is willing to pay for the spot from the reservation request. The reserving can include designating the reservation as a shared reservation and applying the user-designated amount to a total payment amount for the particular outdoor adventure, the applying leaving a remainder of the total payment amount unpaid. The computer-implemented method can further include transmitting, in response to the determining, a request for permission to designate the particular outdoor adventure as a shared adventure to a guide computing device that is associated with a particular guide for the particular outdoor adventure; and receiving, by the computing device, permission from the particular guide. The designating can be performed in response to receiving the permission from the particular guide.

In another implementation, an activity-sourcing system for connecting users with sources of outdoor or physical activities can include means for receiving posts for available activities from activity source computing devices; and means for providing one or more activity options to user computing devices in response to queries including at least a minimum set of activity parameters.

Such an activity-sourcing system can optionally include one or more of the following features. The minimum set of activity parameters can include at least three of: location information, equipment information, time information, duration information, user-selected intensity thresholds, participant skill level thresholds, group size information, share information, and price information.

In another implementation, a computer-implemented method includes receiving, at a computer system and from a client computing device, a request for activities that satisfy one or more criteria; accessing, by the computer system, a centralized data repository of available activities that are provided by a plurality of different activity sources; identifying, by the computer system, one or more activities based on a comparison of the one or more criteria to data associated with the available activities; generating, by the computer system, code that includes information for the one or more activities, the code being generated for execution or interpretation on the client computing device; and transmitting, by the computer system, the code to the client computing device, wherein the client computing device is programmed to automatically execute or interpret the code upon receipt so as to present a graphical user interface presenting the one or more activities and a selectable feature to reserve at least a portion of the one or more activities.

In another implementation, a computer-implemented method includes receiving, at a computer system, a request for available outdoor activities that meet activity criteria; and providing, by the computer system, information describing one or more available outdoor activities that satisfy the activity criteria.

In another implementation, a computer system includes a frontend to receive requests for available outdoor activities that meet activity criteria and to provide information describing one or more available outdoor activities that satisfy the available criteria; and a backend to identify the one or more available outdoor activities that satisfy the activity criteria.

Certain implementations of the improved system or method may provide one or more advantages. For example, users and guides can be more efficiently and accurately paired with each other through a centralized computer system (e.g., cloud based computer system, server system). For instance, instead of relying on a web search or internet-based service listings to identify guides or other activity sources/providers for an outdoor adventure (e.g., trip, outdoor experience), guides can post location-specific adventures to a centralized repository that is searchable by users based upon a number of query options (e.g., current or selected location, time of day, available or required equipment, range of costs, cost-sharing bid opportunities, stored user preferences, historical reviews from previous users, a user-specific input level of adventure/risk, or the like), and such users can readily access offerings from multiple different guides and over multiple different geographic locations/regions. Additionally, users and guides can have a persistent and centralized forum that provides a social media platform for sharing images and postings regarding a selected adventure or experience with a guide, for identifying other interested users to share in a group adventure or other activity, for providing reviews/ratings accessible by other users of the system regarding a selected adventure or experience with a guide, and for disputing/resolving erroneous reviews/ratings. Instead of visiting multiple different sites, having to rely on a search engine to effectively surface guided adventures that are relevant to a user, or being uncertain about the reliability or quality of a particular guide or adventure, users are able to access a single platform to identify relevant and reliable guides or adventures that satisfy particular adventure-related criteria (e.g., time/date, duration, intensity, location, type of adventure, available or required equipment, cost-sharing opportunities, etc.).

In another example, mobile apps and web applications that are used by client computing devices to communicate with a centralized computer system can include GUIs that are specifically designed to ensure that relevant information is displayed on client computing devices so that it is readily usable regardless of the form factor and/or size of the client computing devices' display. For example, mobile apps and web applications can be programmed to dynamically reposition and resize content transmitted to client computing devices over the internet (and/or other networks) so that content has at least a threshold size and spacing from other content to be readily viewed and acted upon by users. Additionally, the centralized computer system can be programmed to encode content (e.g., encode in one or more markup languages) that is transmitted to client computing devices so that it is presented in a similar manner across different client computing devices, such as in different application environments (e.g., mobile apps, web browsers, virtual reality interfaces, wearable computing device interfaces), different computing devices (e.g., mobile computing devices, laptops, desktops, virtual reality headsets, wearable computing devices (e.g., smartwatches, augmented reality glasses)), an/or different displays (e.g., different display types, different display form factors, different display resolutions, different display sizes). Such features (and/or other GUI features described in this document) can improve the GUI as presented on client computing devices.

In a further example, mobile apps and web applications can additionally be programmed to minimize network traffic and, thus, improve the performance of the client computing devices and centralized computer system. For example, mobile apps and web applications running on client computing devices can be programmed to delay transmission of a guide/adventure search query until all parameters have been provided by a user so that intermediate results (e.g., results based on a portion of the parameters), which may only be partially relevant to the user, are not served to the user, which could cause wasted/unwanted network traffic. In another example, mobile apps and web applications can be programmed to cache guide and adventure information transmitted by a centralized computer system for at least a threshold period of time (e.g., 1 week, 1 month, 3 months, 1 year) and to reference the cache before requesting files and other data from the centralized computer system so as to avoid retransmission of information already contained on client computing devices. In another example, a centralized computer system and client computing devices can be programmed to use one or more data compression protocols that are common to across the centralized computer system and client computing devices so as to minimize an amount of network traffic for the centralized computer system and client computing devices to communicate.

In another example, mobile apps and web applications can be programmed to minimize the use of computing resources on client computing devices, which can minimize power consumption, improve operational efficiency, and overall improve the operation of client computing devices. For example, mobile apps and web applications can be programmed identify and register event handlers for particular client computing devices so that device components, like location services, are accessed at particular times during operation of the mobile apps and web applications instead of being continually polled. For instance, an event handler may be registered on a client computing device so that location services are only polled when a user has selected a button to identify guides or outdoor adventures that are located near the client computing device's current location.

The details of one or more embodiments are set forth in the accompanying drawings and the description below. Other features and advantages will be apparent from the description and drawings, and from the claims.

DESCRIPTION OF DRAWINGS

FIGS. 2A-H are a set of example screenshots for a GUI that can be used for registering an activity source and a post for an available activity.

FIG. 5 is an example technique that can be implemented for posting, reserving, and summarizing available activities through.

FIGS. 7A-G are a set of example screenshots for a GUI for exploring and reserving available adventures through collection-based groupings FIGS. 8A-D are a set of example screenshots for a GUI for viewing a user/adventure provider passport.

FIGS. 9A-F are a set of example screenshots for a GUI for user and/or adventure provider profiles.

Like reference symbols in the various drawings indicate like elements.

DETAILED DESCRIPTION

Figure 1:
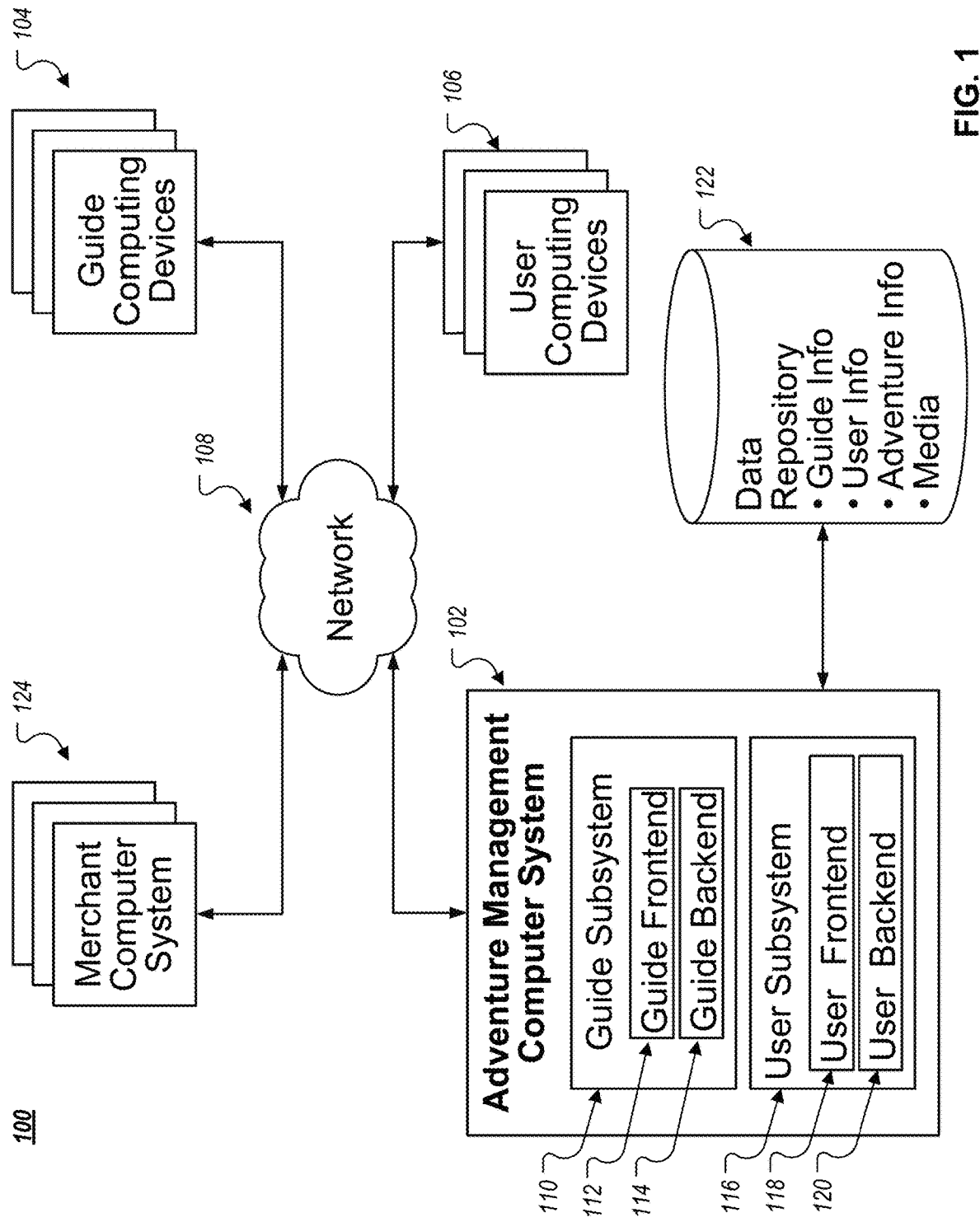
FIG. 1 is a diagram of an example location-based activity-sourcing computer system.

FIG. 1 is a diagram of an example location-based activity-sourcing computer system 100 that provides a platform with social media inputs/outputs and location-based information for connecting users with sources of outdoor guide opportunities or other activities based on a set of factors (e.g., location, time of day, date, available or required equipment, range of costs, cost-sharing bid opportunities, stored user preferences, historical reviews from previous users, a user-specific input level of adventure/risk, or the like). In particular embodiments, the improved platform can be implemented in a manner that provides a location-based guide-pairing computer system configured to pair users seeking a physical activity (e.g., either a specific, predetermined activity or a spontaneous, previously unplanned or unknown activity) with a variety of filtered sources for such activity user. The example system 100 includes an adventure management computer system 102 that can act as a centralized computer system to facilitate connections between activity sources/providers (such as guides in this example) using activity-sourcing computing devices 104 (referred to as guide computing devices 104 in this example) and user employing user computing devices 106.

The computer system 102 can include one or more computing devices, such as a computer server, a desktop computer, a laptop computer, and/or other specially programmed computing devices. For example, the computer system 102 can be a server system and/or a cloud-based computer system. The computer system 102 is programmed to provide a centralized system through which activity sources/providers (such as guides in this example) can register, post proposed outdoor adventures outdoor experiences/trips), receive payments, distribute summaries and media for outdoor adventures to users, and manage user reviews/ratings; and through which users can register, identify and register for particular adventures that are of interest, submit payments for outdoor adventures, provide reviews/ratings, and/or share and receive media and other information related to adventures. Other features are also possible with the computer system 102.

The guide computing devices 104 and the user computing devices 106 can be any of a variety of computing devices that are used by guides and users, respectively. For example, the computing devices 104-106 can be mobile computing devices, peripheral computing devices (e.g., wearable computing devices, virtual reality headsets), laptop computers, desktop computers, and/or other types of computing devices. Guides and users can each be associated with one or more of the computing devices 104-106. The computing devices 104-106 can communicate with the computer system 102 using code that is installed, executed, and/or interpreted on the computing devices 104-106, such as mobile apps, web applications downloaded and run in a web browser application, and/or other applications. The guide computing devices 104 can run the same or different applications/code from the applications/code that is run on the user computing devices 106. For example, the guide computing devices 104 may download a guide-specific mobile app from the computer system 102 (and/or from a separate computer system, such as a computer system providing a mobile app store) and the user computing devices 106 may download a different user mobile app. In another example, the guide computing devices 104 and user computing devices 106 may download the same mobile app, but access different features that are part of the mobile app once logged-in to the mobile app as either a guide or a user.

The computer system 102 and the computing devices 104-106 can communicate over one or more networks 108, such as the internet, local area networks (LAN), wide area networks (WAN), virtual private networks (VPN), wireless networks (e.g., WiFi networks, BLUETOOTH networks), wired networks, fiber optic networks, mobile data networks (e.g., 4G networks), or any combination thereof. The computer system 102 and/or the computing devices 104-106 may be bandwidth/data constrained by their respective internet service providers (ISP), so the computer system 102 and/or the computing devices 104-106 can be programmed to use any of a variety of particular techniques to minimize and make network transmissions more efficient as part of the system 100, such as through caching and/or data compression techniques.

The computer system 102 can include components that are specifically programmed to interface with the guide computing devices 104 and user computing devices 106 to manage and serve requests for each of these types of devices. For example, the computer system 102 includes a guide subsystem 110 with a guide frontend 112 and a guide backend 114 that are programmed to process requests from the guide computing devices 104. For example, the guide computing devices 104 can transmit requests to register, post proposed outdoor adventures, receive payments, distribute summaries and media for adventures to users, and manage user reviews/ratings over the network 108 to the computer system 102. These requests can be directed to the frontend 112 of the guide subsystem 110 (e.g., addressed to a URL associated with the guide subsystem 110, transmitted to a port of the computer system 102 associated with the guide subsystem 110, include a parameter or other identifier associated with the guide subsystem 110), which can invoke one or more portions of the guide backend 114 to determine and process the requests. Responses determined by the guide backend 114 can be served back to the guide computing devices 104 by the frontend 112 over the network 108. Additionally, in particular instances, the guide backend 114 can transmit information and/or commands to the user subsystem 116, such as providing guide's response to a user's message.

Similarly, the example computer system 102 includes a user subsystem 116 with a frontend 118 and a backend 120 that are programmed to process requests from the user computing devices 106. For example, user computing devices 106 can transmit requests to locate particular outdoor guided opportunities, such as searching based on the type of opportunity (e.g., hiking, fishing, hunting), geographic location or region (e.g., city, state, zip code, user-designated geographic region, proximity to the user's current location), availability at one or more dates and times (e.g., specific day and time, range of dates), user-generated reviews or ratings (e.g., reviews and/or ratings from users who previously used a particular guide and/or particular trip), gear requirements (e.g., list of gear that is needed to participate in a particular trip), referrals or recommendations from other users (e.g., recommendations from friends), price (e.g., cost to participate in a guided trip), and/or other fields/information to identify particular guided opportunities. Such requests can be directed to the frontend 118 of the user subsystem 116 (e.g., addressed to a URL associated with the user subsystem 116, transmitted to a port of the computer system 102 associated with the user subsystem 116, include a parameter or other identifier associated with the user subsystem 116), which can invoke one or more portions of the user backend 120 to determine and process the requests. Responses determined by the user backend 120 can be served back to the user computing devices 106 by the frontend 118 over the network 108. Additionally, in particular instances, the user backend 116 can transmit information and/or commands to the guide subsystem 110, such as providing information confirming a user's reservation for an adventure opportunity posted by a guide through the guide subsystem 110.

The computer system 102 accesses and uses a data repository 122 to store information for providing location-based outdoor guide and outdoor adventure services for users and guides. The data repository 122 can include any of a variety of information, such as guide information (e.g., guide name, guide contact information, guide username and password, guide computing device identifier(s), guide skills and experience, guide location(s), photos and videos of guides), user information (e.g., user name, user contact information, user username and password, user computing device identifier(s), user interests, user gear, user location (s)), adventure information (e.g., type of adventure, geo-tagged locations for the adventure, date and time, duration, required gear, recommended commercial gear to purchase for the adventure, skills/experience needed for adventure, skills/experience to be gained, example photos and summaries from similar adventures, reviews/ratings for the adventure), and/or media (e.g., adventure photos and videos shared with users). Other information is also possible.

The example system 100 additionally includes a merchant computer system 124 that can be linked to by URLs included in content provided to the user computing devices 106. The URLs can link to web pages (or other online-accessible interfaces) for products that are recommended by guides, such as products includes in a gear kit that a guide recommends for a particular outdoor adventure. For example, a guides' post for an outdoor adventure, as designated through one or more of the guide computing devices 104, can include information about the outdoor adventure as well as a recommended gear kit (and/or a gear setup that the guide him/herself uses) with links to these specific items for sale on the merchant computer systems 124. The URLs can include one or more unique referral fields that uniquely identify the computer system 102 and/or a corresponding guide who recommended the particular gear item. When orders are processed through such URLs to merchant computer systems 124, the merchant computer systems 124 may provide a commission to the computer system 102 and/or to corresponding guides who provided the gear recommendations.

While this document describes examples of activity sources/providers as guides, other activity source/providers are also possible with the disclosed technology, such as people and/or entities providing any of a variety of services, such experts providing demonstrations, instructors providing lessons, equipment owners/managers providing equipment/gear for use/rental, property/facility owners/managers providing use of a property (e.g., building, land, sports field), and/or other appropriate services. Similarly, guide services and outdoor activities are provided as examples of available activities, and other activities are also possible with the disclosed technology, such as equipment use/rental, property use/rental, instructions, lessons, demonstrations, professional services, and/or other activities. Additionally, guide computing devices are examples of activity-source computing devices and other types of activity-source computing devices are also possible with the disclosed technology, such as computing devices used by experts, instructors, equipment owners/managers, property owners/managers, and/or other people and/or entities. The disclosed technology (as described throughout this document) can be extended and/or adapted to other activity sources/providers, other available activities, and/or other activity-source computing devices not explicitly described in the examples in this document.

The example computer system 100 can be used to provide the example GUI interfaces that are described with regard to FIGS. 2-4 below.

Referring now to FIGS. 2A-H, a set of example screenshots for a GUI can be used for registering an activity source (such as a guide in this example) and a post for an available activity (such as an outdoor adventure led by the guide in this example). The example GUIs can be provided on example guide computing devices, such as the guide computing devices 104. The depicted GUIs are example web applications that can be provided through web browsers (e.g., GOOGLE CHROME, SAFARI, INTERNET EXPLORER) being executed on, for example, the guide computing devices 104 using web pages downloaded from the computer system 102 over the network 108. The example web pages can include one or more types of code (e.g., markup code, scripts) that are executed/interpreted by the guide computing devices 104 to provide an interactive web application on the guide computing devices 104 through synchronous and/or asynchronous requests transmitted to the computer system 102 over the network 108. Although the example GUIs depicted in FIGS. 2A-H are depicted as web applications, they can additionally and/or alternatively be implemented in other formats, such as for mobile apps specifically programmed for one or more mobile computing devices (e.g., IOS smartphones, ANDROID smartphones, tablet computing devices).

The depicted GUIs (FIGS. 2A-H) are example web applications that can be provided through web browsers (e.g., GOOGLE CHROME, SAFARI, INTERNET EXPLORER) being executed on, for example, the guide computing devices 104 using web pages downloaded from the computer system 102 over the network 108. The example web pages can include one or more types of code (e.g., markup code, scripts) that are executed/interpreted by the guide computing devices 104 to provide an interactive web application on the guide computing devices 104 through synchronous and/or asynchronous requests transmitted to the computer system 102 over the network 108. Although the example GUIs depicted in FIGS. 2A-H are depicted as web applications, they can additionally and/or alternatively be implemented in other formats, such as for mobile apps specifically programmed for one or more mobile computing devices (e.g., IOS smartphones, ANDROID smartphones, tablet computing devices).

Figure 2A:
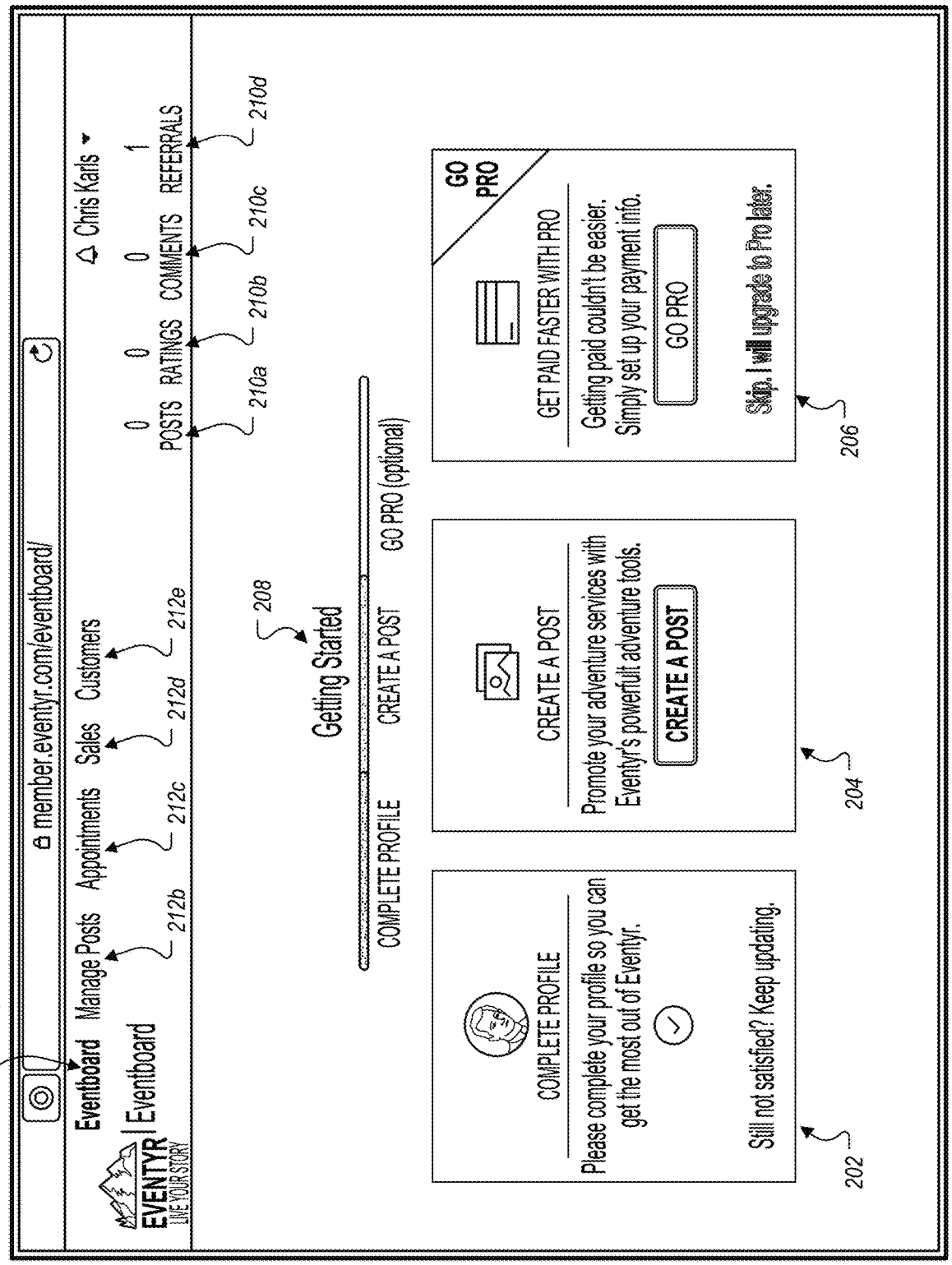

Referring to FIG. 2A, a first example GUI 200 through which a guide can initially register with an adventure management computer system (e.g., the computer system 102). In this example, the guide can already have input basic profile information (as indicated by the "complete profile" section 202), such as name, address, telephone number, email address, profile picture, payment account, and/or other information. As part of setting up an account, a guide can additionally be prompted to create a post for an outdoor adventure that users can register and participate in, as indicated by the "create a post" section 204, which includes one or more selectable features (e.g., button, link) to create a post. The guide can also be prompted to create a "pro" account (as identified in the "go pro" section 206), which may provide any of a variety of enhanced features through an adventure management computer system, such as receiving payment more quickly (e.g., receiving advanced payment from the computer system once client payments have been received but not yet cleared financial institution providing the payments) and/or being able to view enhance metrics/information about the guide's performance on the system. The guide can be provided with a progress indicator 208 to indicate how far along the initial setup process the guide currently is and to identify which steps remain.

The example GUI 200 also includes a number of additional selectable features that can be used to navigate across the guide interface to manage the guide's profile, posts, and user interactions. For example, guides can navigate to different portions of the interface through the example links 210a-d and 212a-e. The example links 210a-d provide a guide with an overview (e.g., count) of the guides current activity on the site and the ability to navigate to pages to view/manage/modify those aspects of the guide's activity. For instance, link 210a identifies the number of posts for the guide (zero in this example since the guide is registering on the GUI 200) and provides a link to a page to view posts (see FIG. 3B); link 210b identifies a number of ratings provided by users for the guide and/or outdoor adventures provided by the guide and a link to a page to view/contest/analyze the ratings; link 210c identifies a number of comments provided by users for the guide and/or outdoor adventures provided by the guide and a link to a page to view/respond to/analyze the comments; and link 210d identifies a number of referrals (e.g., referrals to join the site and/or participate in an outdoor adventure) provided by and/or to the guide and a link to a page to view a summary of referrals associated with the guide.

The example navigation links 212a-e provide links to other portions of the site, including an eventboard interface (accessible via link 212a), a post interface (accessible via link 212b), an appointments interface (accessible via link 212c), a sales interface (accessible via link 212d), and a users interface (accessible via link 212d). An eventboard interface can be an interface through which a chronological stream of activity on the site related to a particular guide-such as registrations for a guide's posts, comments related to the guide's services, and payments received for the guide's services—can be displayed with links for the guide to manage and be alerted to recent happenings relevant to the guide (see FIG. 3A). A post interface be an interface through which a guide can view, manage, edit, and add posts that are currently and/or were previously being offered on the site for a guide (see FIG. 3B). An appointments interface can be an interface through which a guide can view current user registrations for the guide's posts (see FIG. 3C). A sales interface can be an interface through which a guide can view and analyze information on their sales on or through the site (see FIG. 3D). A users interface can be an interface through which a guide can view and manage user relations that are relevant to the guide's services (see FIG. 3E). Other links and interfaces on the site are also possible.

Figure 2B:
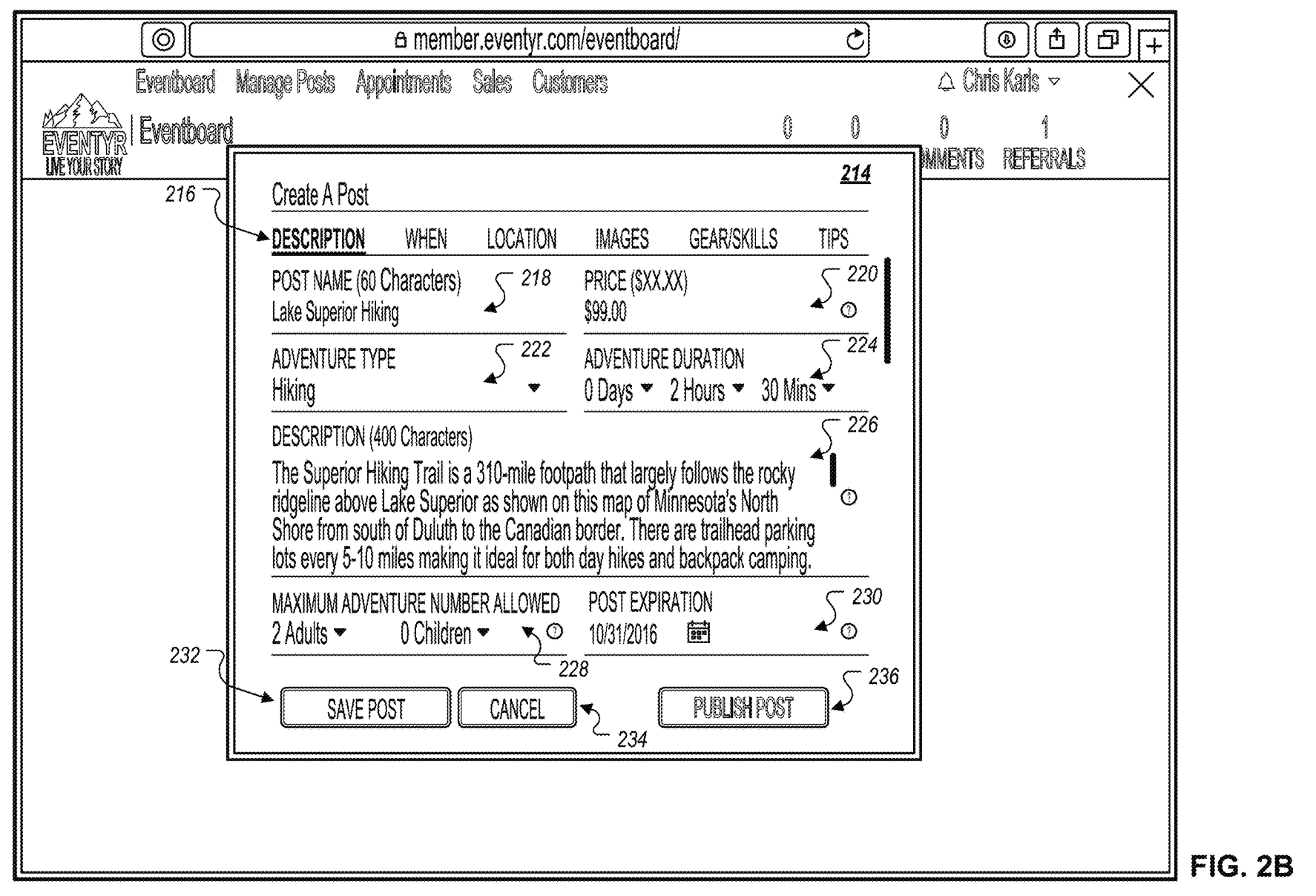

Referring to FIG. 2B, an example GUI 214 is presented (i.e., in response to the user selecting a link in the create a post section 204) through which a guide can create a post. The GUI 214 in this example overlays the GUI 200 and can be dynamically presented without a web browser needing to navigate to a new or different URL, which can provide a more responsive, faster, and improve web application GUI on the guide computing device. The GUI 214 includes a description tab 216 (selected) through which the outdoor adventure provided by the guide can be described by the guide. This tab 216 includes a name field 218 (name for outdoor adventure), a price field 220 (price for a user to participate in the outdoor adventure), an adventure type field 222 (type of adventure, such as hiking, fishing, hunting), a duration field 224 (length of time for the outdoor adventure, which can range from minutes to days), a textual description field 226 (longer description of and background information for the outdoor adventure), a maximum number of participants field 228 (maximum number of adults and/or children who can participate in a given adventure), and an expiration date field 230 (date on which the post will expire and no longer be active for users to register for the service).

Posts can persist over a period of time and can present multiple different outdoor adventure instances over that period of time until their expiration point. For example, the example post for a hiking adventure identified in GUI 214 can create multiple different (e.g., daily) instances of the adventure (up until the expiration date) that users can reserve without the guide having to reenter/resubmit the post for each instance. An adventure management computer system (e.g., computer system 102) can be programmed to create such multiple instances based on guide schedule inputs, as discussed below with regard to FIG. 2C.

Additional and/or alternative fields are also possible, such as a shared adventure field (field through which a guide can designate whether an adventure can be shared by different users and/or across different user accounts) and/or one or more adjusted pricing levels for additional parties in a group (fields through which guides can designate higher and/or lower marginal prices for additional users participating in the trip). For example, guides can allow for different users to share an adventure, with each user paying a portion of the adventure cost (e.g., pro rata price per user, user-designated contribution amount to the adventure). Guides may activate and/or deactivate such a shared adventure field. In another example, adjusted pricing levels can allow for a guide to accommodate groups of varying sizes while accounting for the guide's economies of scale for the adventure. For instance, a guide may own a fishing boat the seats 3 users and may offer the guide trip for up to 3 users at $300. However, for groups between 4-7, the guide may need to rent a larger boat, which can increase the guide's cost to provide the adventure. Accordingly, the guide may designate that the price of the adventure for groups between 4-7 users at $1,000, which is a higher price per user than for a smaller sized group. For groups larger than 7 users, the guide may rent a second boat and also need to get another guide to accompany him/her, and may set an even higher price per user at that level to account for these increased costs (second boat rental, second guide).

The GUI 214 also includes a save post button 232 to save the information entered into the fields 218-230, a cancel button 234 to discard this information, and a publish post button 236 through which the post can be published to users. Until the publish post button 236 has been selected, a post may not be viewable by users. In this example, the publish post button 236 is grayed-out/deactivated since the guide has not completed all of tabs for the post. The publish post button 236 can be activated once a sufficient amount of information for the post has been entered and/or saved, as determined either through local code executed on the client device and/or server-side code executed on the computer system.

Figure 2C:
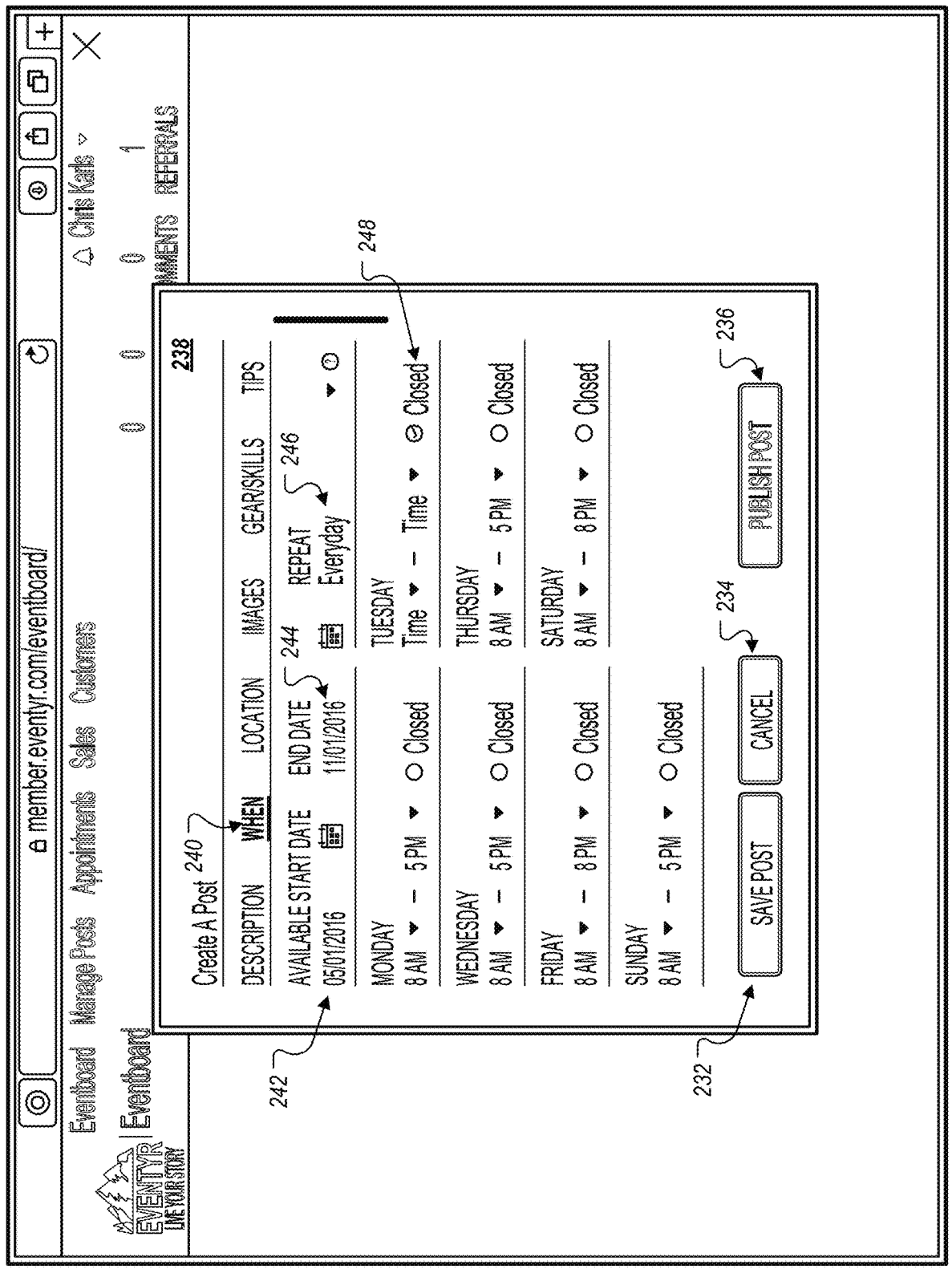

Referring to FIG. 2C, an example GUI 238 is depicted in which the "when" tab 240 is selected to allow the guide to designate the iterative repetition of the outdoor adventure described in the post over a period of time. Fields in this example GUI 238 include a start date field 242 (designating a start of the period of time over which the outdoor adventure can be repeated for user reservation), an end date field 244 (designating an end to the period of tie), a repetition interval field 246 (designating an time interval over which instance of the outdoor adventure are repeated for presentation to users), and schedule fields 248 (designating days of the week and times during which the outdoor adventure can occur).

An adventure management computer system can be programmed to cross-reference the repetition interval field 246, the schedule field 248, and the duration field 224 to determine instances of the outdoor adventure are not proposed at intervals more frequent than the duration of the adventure or, in some implementations, to remove down or upstream instances of the adventure that would conflict with a reserved instance. For example, for adventures having a duration of 2 days, the adventure management computer system may either limit the instances to occurring once every 2 days (so long as it does not conflict with the schedule field 248) or may permit instances to occur on a daily basis, but once an instance is reserved, may eliminate instances occurring the day before and the day after the starting date for the reserved instance (removing conflicting time periods once a reservation has been set at a designated time). Such a feature can permit for greater efficiency and flexibility in establishing reservations for users.

Figure 2D:
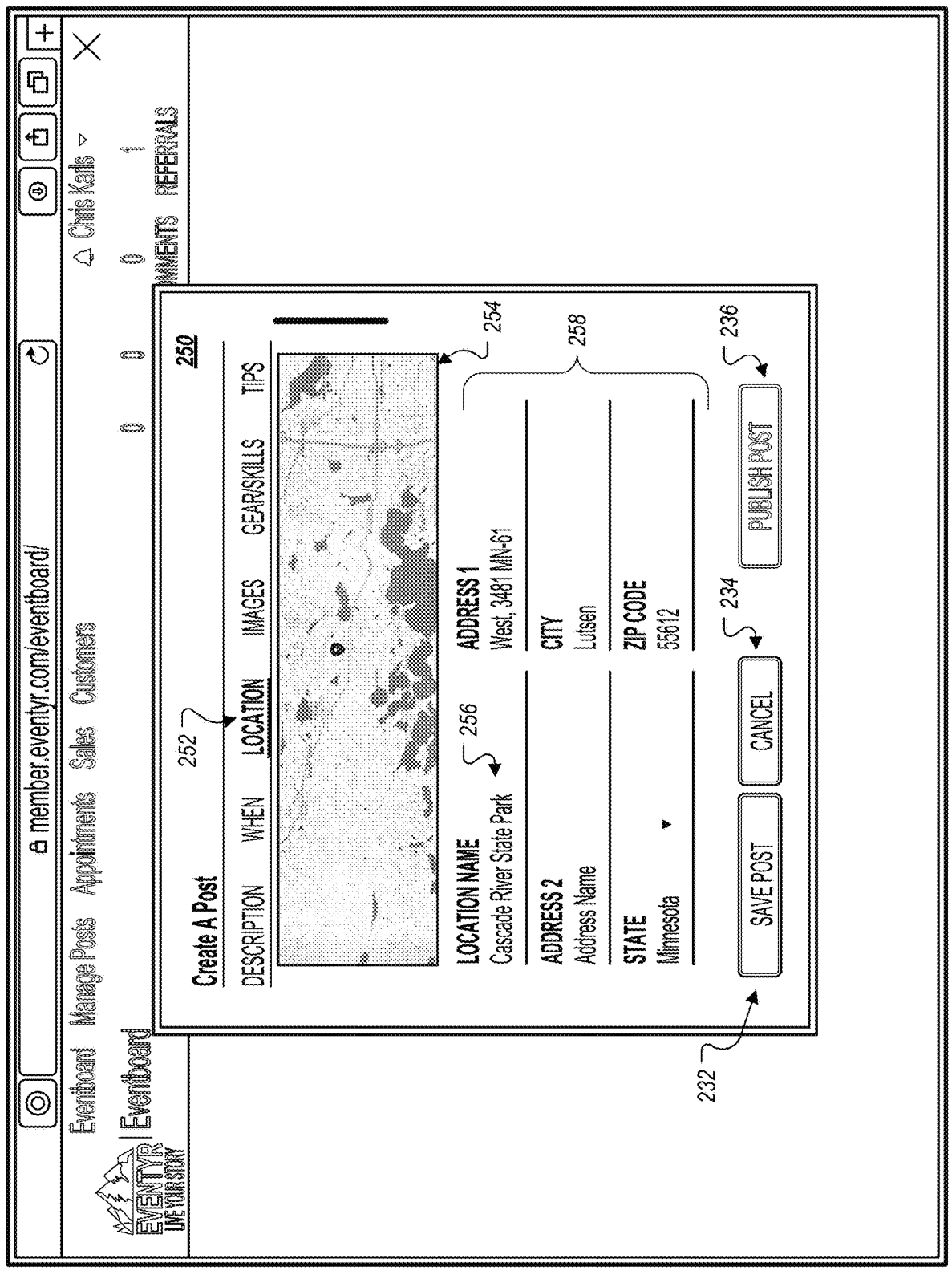

Referring to FIG. 2D, an example GUI 250 is presented for the "location" tab 252 through which a guide can designate one or more locations that are associated with the outdoor adventure for the post. This example GUI 250 includes an interactive map 254 through which the guide can designate one or more locations, areas, regions, routes, and/or other geographic markers that are relevant to the adventure. The GUI 250 also includes a location name field 256 that can designate a location where the adventure is to take place and address fields 258 that identify a specific address for the adventure, such as a meet-up location to start the adventure. Locations on the map 254 may be auto-populated based on information entered through the fields 256-258.

Figure 2E:
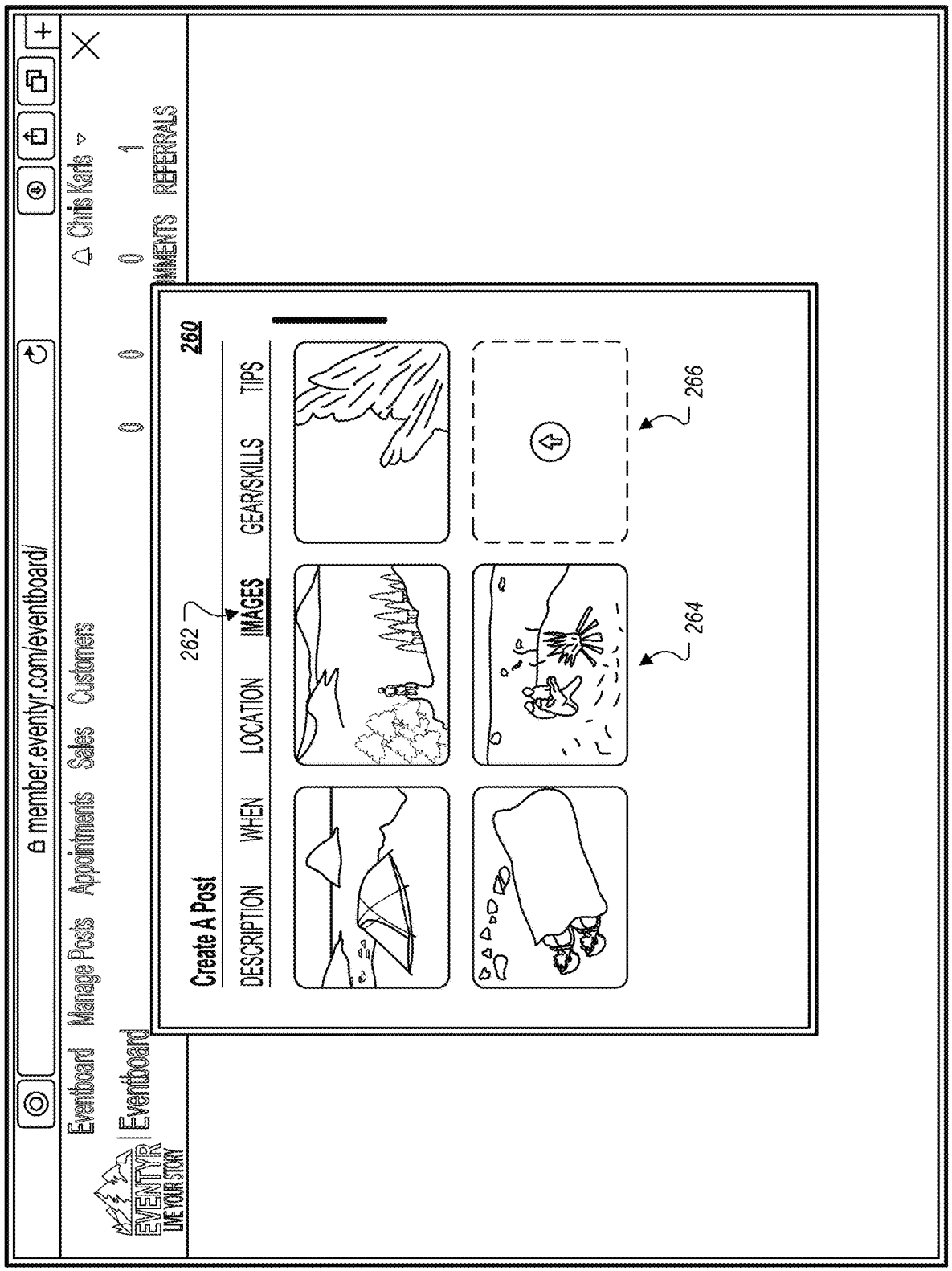

Referring to FIG. 2E, an example GUI 260 is presented for the "images" tab 262 through which a guide can upload images (and/or videos) that depict the outdoor adventure. Images (and/or videos) that have been uploaded are identified by thumbnails 264 and a selectable feature 266 through which additional images (and/or videos) can be uploaded is presented. Images can be uploaded from a guide's local client device, from an adventure management computer system (e.g., images shared by other users who previously participated in the outdoor adventure), and/or from third party websites (e.g., social networking sites, file/photo management systems), which may require user authorization/authentication.

Figure 2F:
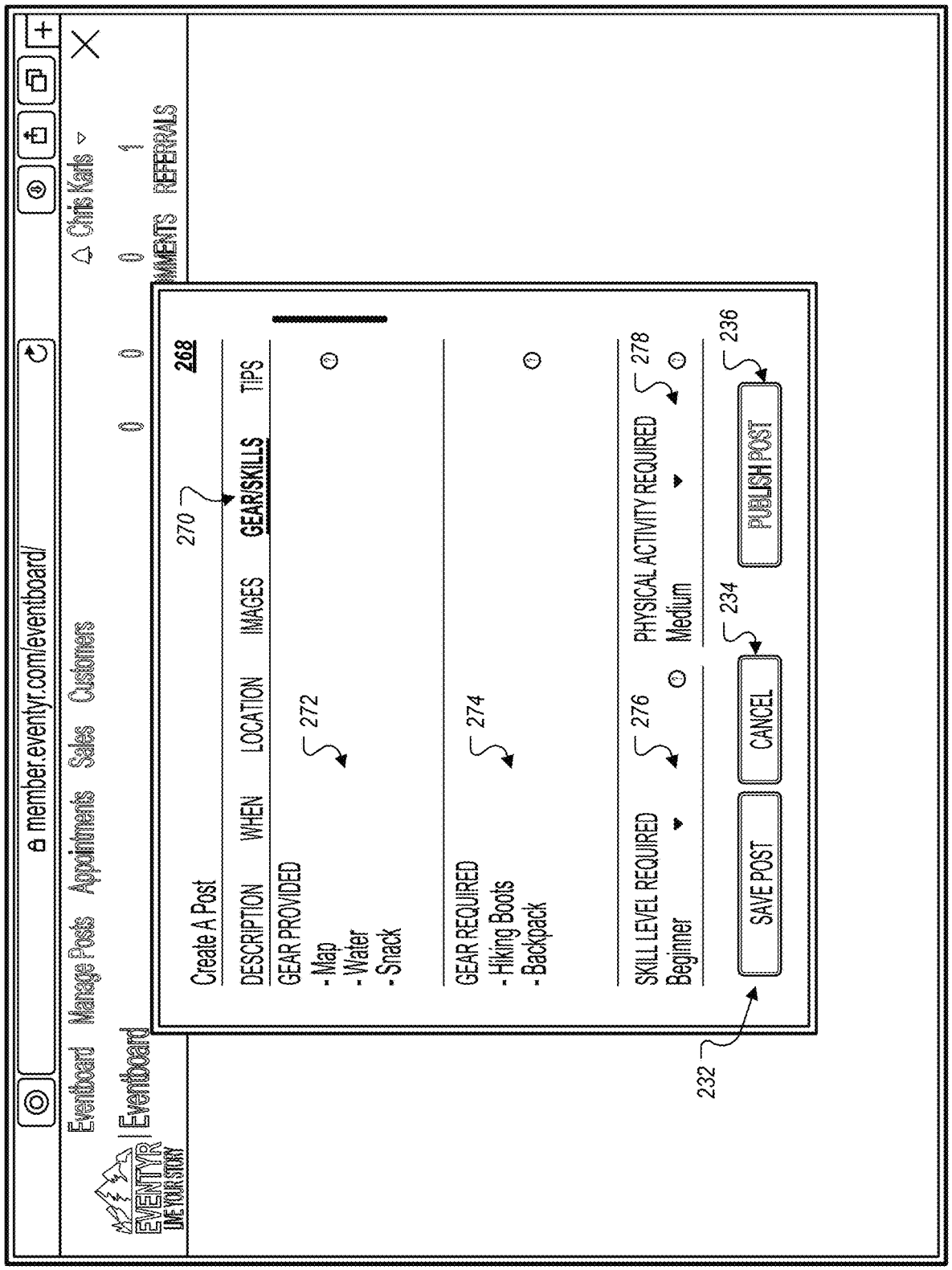

Referring to FIG. 2F, an example GUI 268 is presented for the "gear/skills" tab 270 through which a guide can designate gear that the guide will provide (gear provided field 272), gear that user needs to bring (gear required field 274), a skill level that is required to participate in the adventure (skill field 276), and a physical activity level for the adventure (physical activity field 278). Additionally and/or alternatively, a guide can provide specific gear recommendations to users for the adventure, which can take the form of providing URLs to merchant sites offering the recommended gear items for sale. This can include gear recommendations for one or both of the gear provided field 272 and the gear required field 274. In some implementations, the guide may provide an overview of the guide's gear kit for the adventure (gear that the guide uses for the adventure) with links to purchase the items included in the kit.

Figure 2G:
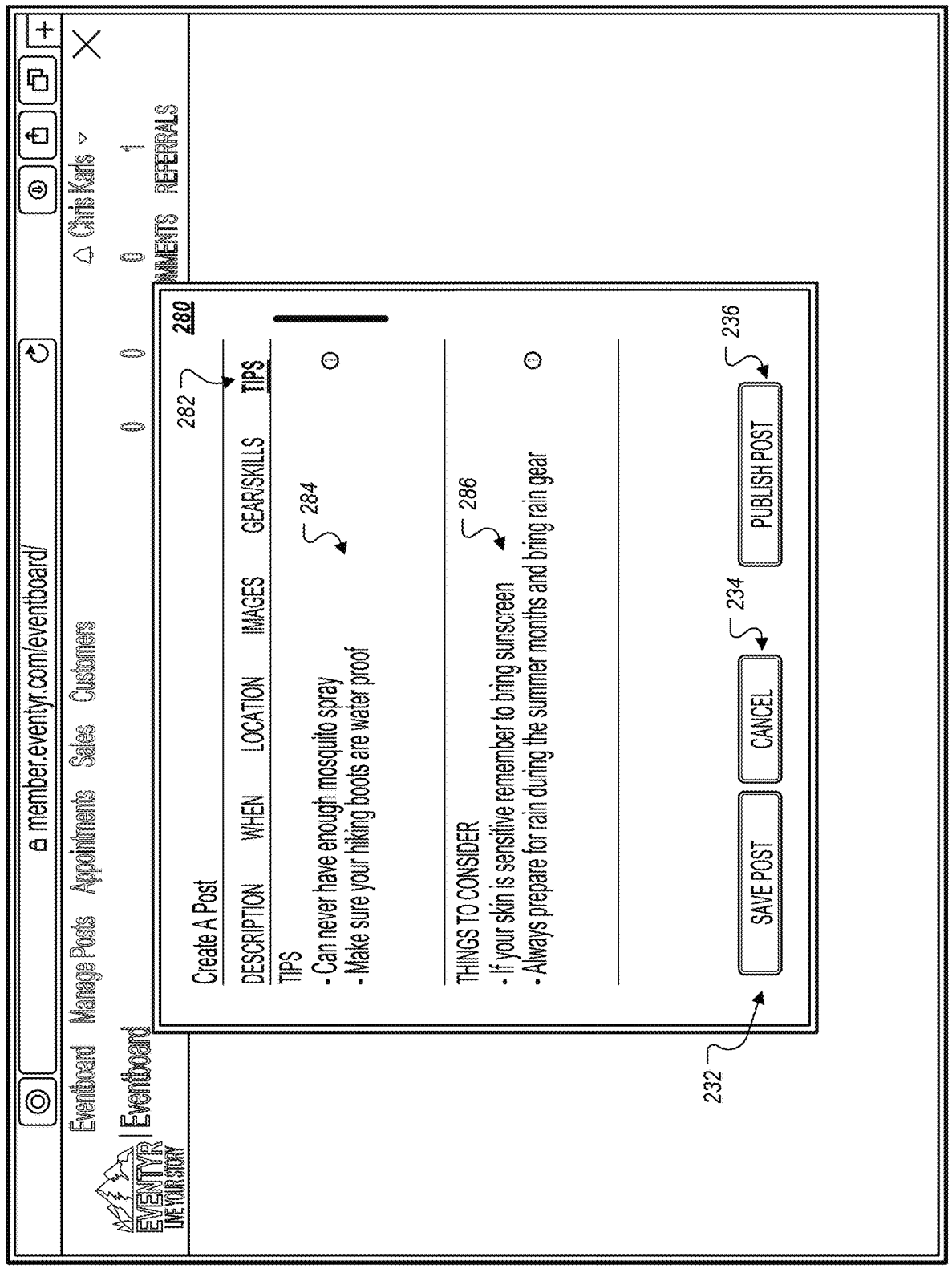

Referring to FIG. 2G, an example GUI 280 is presented for the "tips" tab 282 through which a guide can provide tips for users participating in the adventure to consider (tips field 284) and other things for users to consider for the adventure (things to consider field 286). Once the fields in the tips tab 282 has been completed (or at least a threshold amount of information across the fields and tabs has been completed), the publish post button 236 can be activated to permit the guide to publish the post to be viewed, searched, and reserved by users.

Figure 2H:
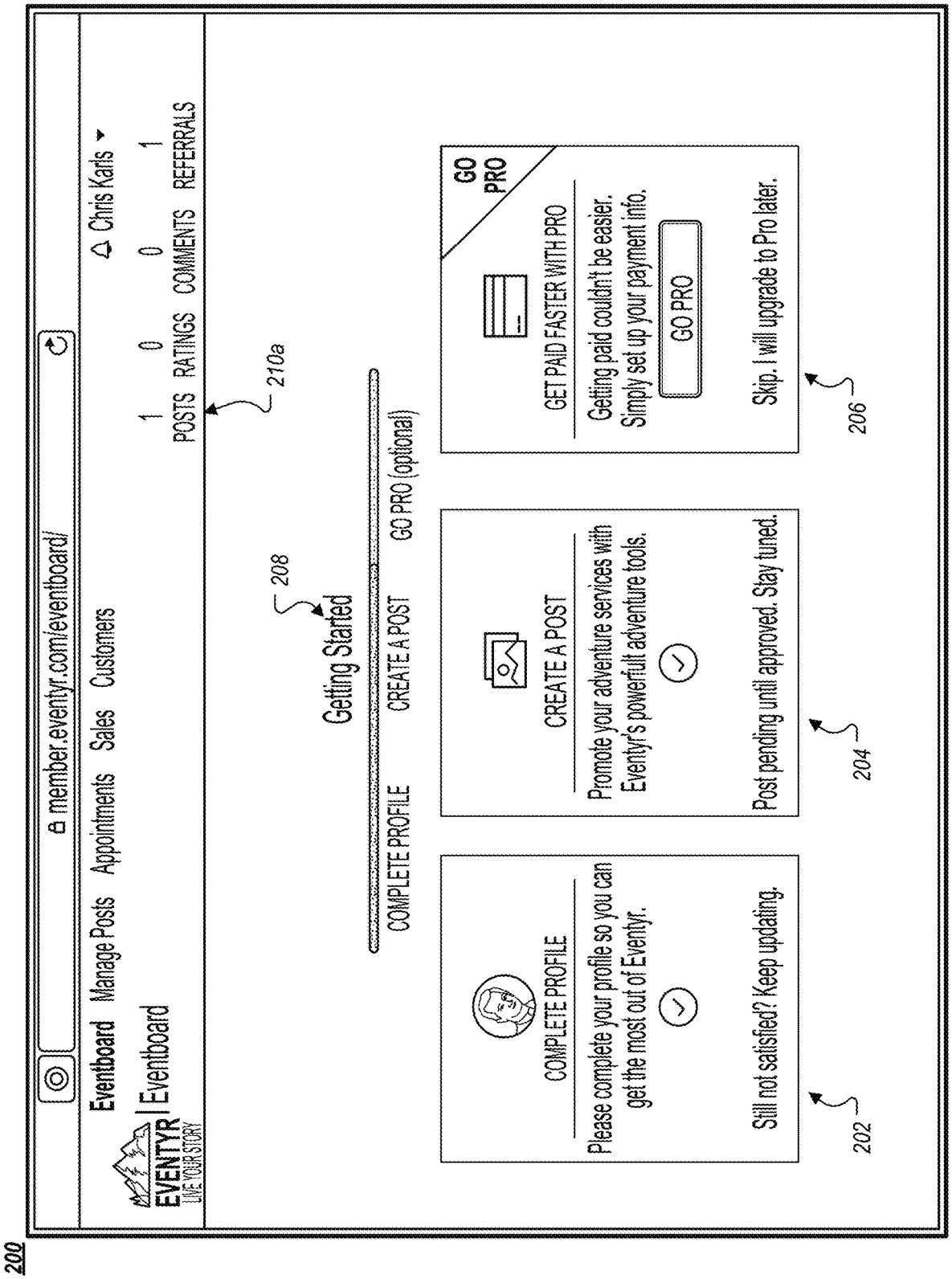

Referring to FIG. 2H, the GUI 200 is presented after the guide has entered/published a post, as indicated by the post counter 210a increasing from 0 posts to 1 post, the create post section 204 being identified as having been completed, and the final step (becoming a "pro" guide) in the example registration process being activate in section 206.

Referring now to FIGS. 3A-E, a set of example screenshots for a GUI can be used for activity sources/providers (such as a guide in this example) to manage their available activities (such as outdoor adventures led by the guide in this example) offered through and performance on an adventure management computer system, such as the computer system 102. The example GUIs can be provided on example guide computing devices, such as the guide computing devices 104. The depicted GUIs are example web applications that can be provided through web browsers (e.g., GOOGLE CHROME, SAFARI, INTERNET EXPLORER) being executed on, for example, the guide computing devices 104 using web pages downloaded from the computer system 102 over the network 108. The example web pages can include one or more types of code (e.g., markup code, scripts) that are executed/interpreted by the guide computing devices 104 to provide an interactive web application on the guide computing devices 104 through synchronous and/or asynchronous requests transmitted to the computer system 102 over the network 108. Although the example GUIs depicted in FIGS. 3A-E are depicted as web applications, they can additionally and/or alternatively be implemented in other formats, such as for mobile apps specifically programmed for one or more mobile computing devices (e.g., IOS smartphones, ANDROID smartphones, tablet computing devices).

Figure 3A:
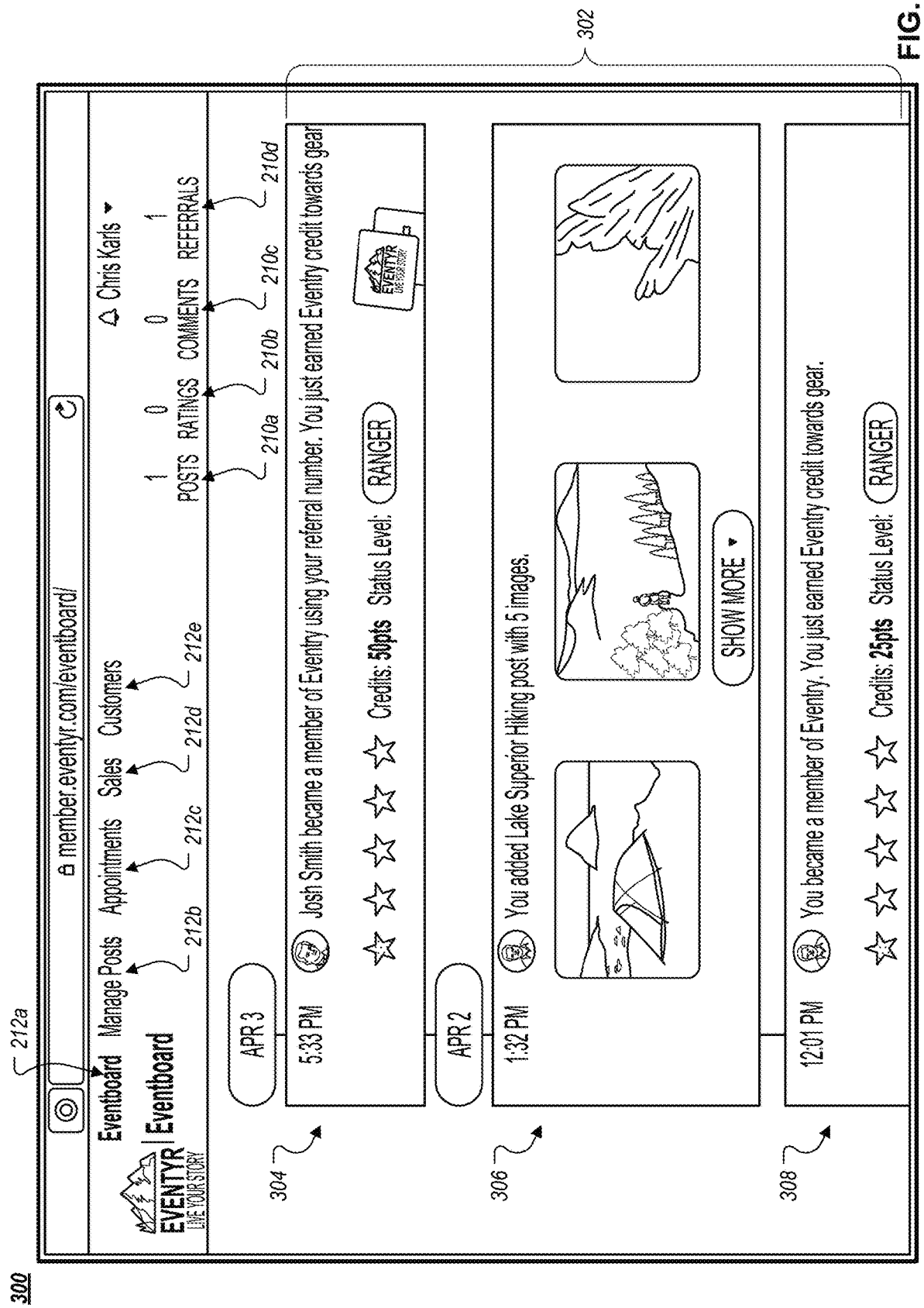
FIGS. 3A-E are a set of example screenshots for a GUI that can be used for activity sources/providers to manage their available activities offered through and performance on an adventure management computer system.

Referring to FIG. 3A, an example GUI 300 is depicted for providing an eventboard for a guide. The GUI 300 includes the navigational links and summary information 210a-d and 212a-e described above with regard to FIGS. 2A-H, and additionally includes a chronological event stream 302 on an adventure management computer system (e.g., the computer system 102) that is relevant to the logged-in guide. The event stream 302 can include any of a variety of events that relate to a guide, such as users registering for adventures posted by the guide, user posting reviews/ratings/comments for adventures they participated in, reminders about upcoming adventures, referrals provided by and/or to the guide, media (e.g., photos, videos) posted on the site in relation to the guide's adventures/services, and/or other events. In the depicted example, the event stream 302 includes a first event 304 indicating that user Josh Smith became a member using a referral code provided by the guide, a second event 306 identifying images that the guide added to a post for a hiking adventure, and a third event 308 indicating that the guide became a member of the site. Additionally, the GUI 300 can include one or more features to filter or search the event stream 302 to a subset of all events, such as filtering the view to particular types of events, events related to particular posts, events for particular users, events that include one or more keywords, and/or other filtering mechanisms. The eventboard GUI 300 may be displayed to a guide as a default page for a site provided by an adventure management computer system and/or in response to user selection of the eventboard link 212a.

Figure 3B:
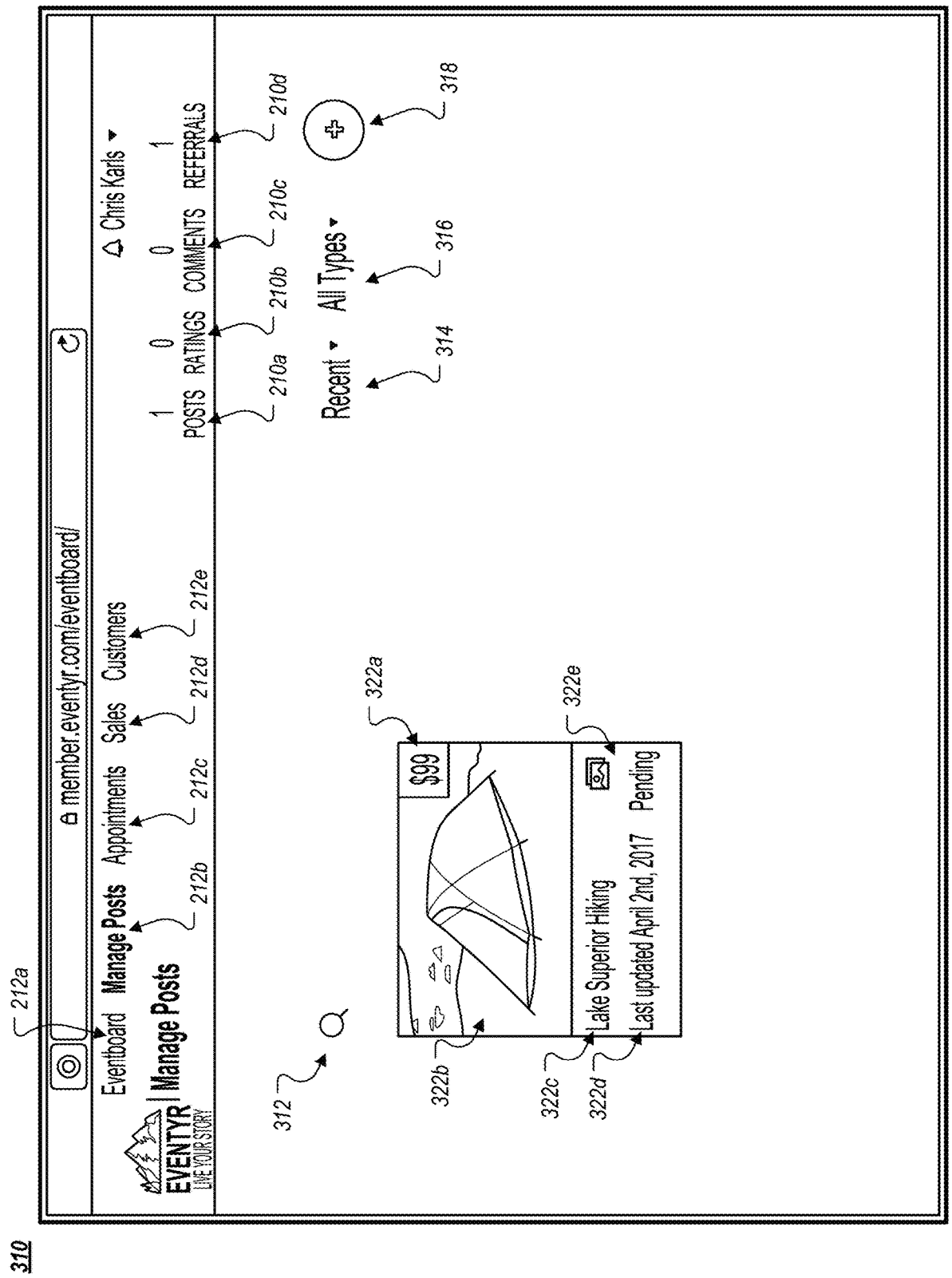

Referring to FIG. 3B, an example GUI 310 is depicted for managing posts for a guide. As with the GUI 300, the GUI 310 includes the navigational links and summary information 210a-d and 212a-e described above with regard to FIGS. 2A-H, and additionally includes posts 320 for the logged-in guide and as well as features 312-316 to filter the posts that are depicted, and a feature 318 to add new posts. The post 320 is the example post that was added through FIGS. 2A-H described above, and includes information summarizing details 322a-e about the post 320, such a price 322a, a representative image 322b, the name for the post 322c, information identifying the last time the post was updated 322d, and information on a current status of the post 322e. In this example, the post 320 is identified as "pending," which can mean that the post is available for user reservation. Other statuses are also possible, such as an inactive status (indicating that the post is no longer available for user reservation), an under review status (indicating that the post is pending administrative review or approval), and/or other statuses.

The view of posts can be filtered and/or sorted based on keywords entered through the search field 312, the recency of the post (314), and/or the type of post (316). A guide can select posts from the display, which can allow guides to review and/or edit details for a post. Selection of the post 320 can cause the GUIs described above with regard to FIGS. 2B-G to be displayed, with the fields being prepopulated with the current data values for the post. The guide can add new posts as well by selectin the feature 318. Selection of the feature 318 can also cause the GUIs described above with regard to FIGS. 2B-G to be displayed, but with the fields blank/empty for the user to fill in.

Figure 3C:
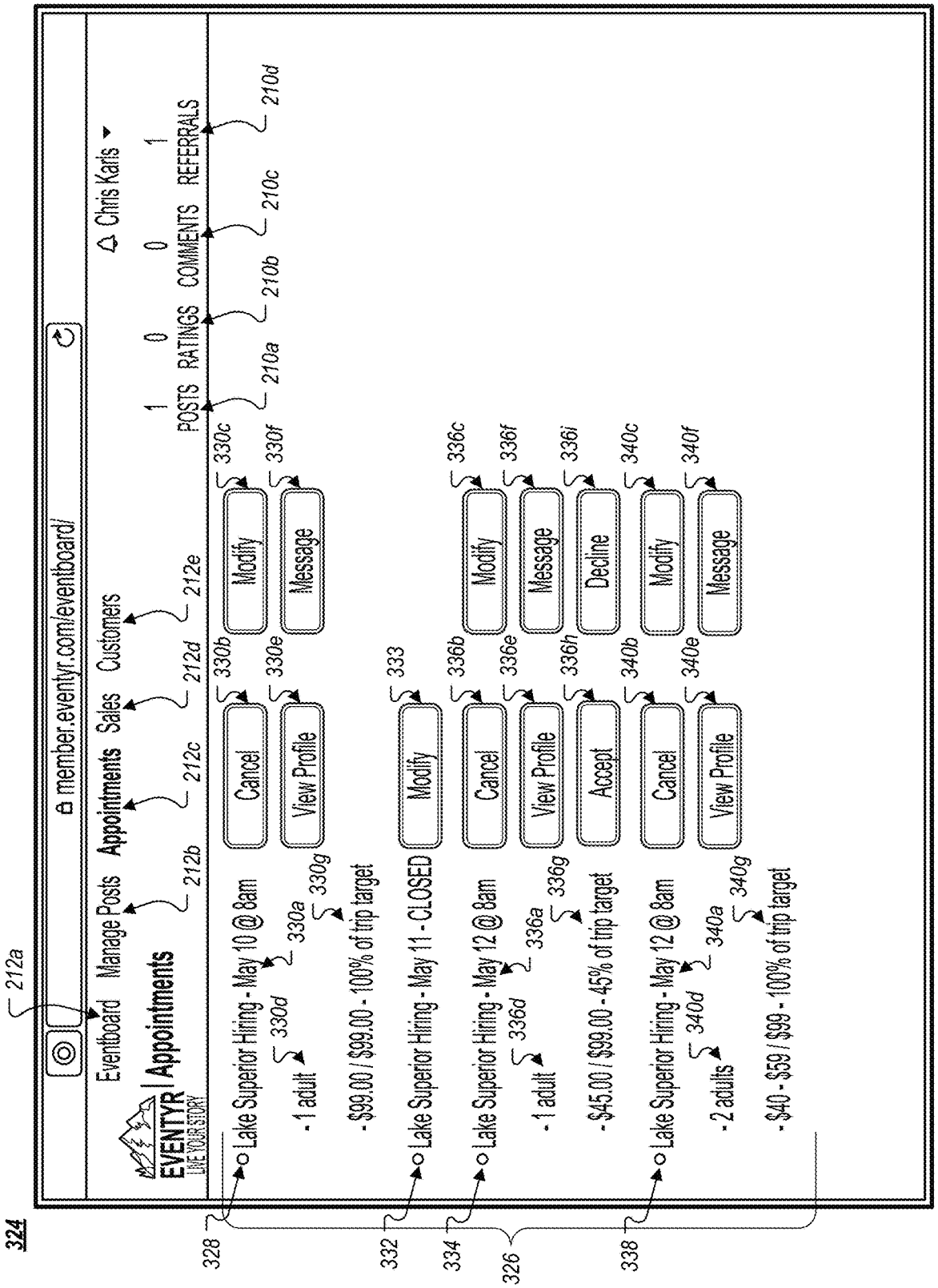

Referring to FIG. 3C, an example GUI 324 is depicted for managing appointments for a guide. As with the GUI 300, the GUI 324 includes the navigational links and summary information 210a-d and 212a-e described above with regard to FIGS. 2A-H, and additionally includes a chronological view 326 of an upcoming schedule of appointments for the logged-in guide. The example view 326 is presented as a chronological list for each day. Additional and/or alternate views are also possible, such as a calendar-based view and/or a calendar-based view in combination with a chronological list. Example appointments 328, 332, 334, and 338 are presented for May 10-13. The example appointment 328 includes a reservation for the example hiking post (described above), and the view 326 provides an overview of information and features 330a-g related to the reservation, such as a summary of the adventure 330a (including date and time, which can be user specified within a range provided by the guide and/or guide designated), a cancel feature 330b (through which the guide can cancel the reservation), a modify feature 330c (through which the guide can propose modifications to the adventure, which can be relayed to the user, who may have the option to opt out of the reservation based on any changes), a user summary 330d (1 adult in this example), a feature 330e to view information about the user (e.g., view the user's profile), a messaging feature 330f (feature through which messages can be transmitted to the user regarding the reservation), and a payment summary 330g (information identifying how much of the target price for the adventure has been met).

The example entry 332 identifies that the guide has indicated that he/she is closed (not accepting reservations on that day), but provides a feature 333 through which the guide can change his/her status to available and accepting reservations on that day.

The example entry 334 is for a partially completed reservation that is capable of being shared across multiple users. The entry includes information and features 336a-g that is similar to the information/features 330a-g, but in this example the payment summary 336g indicates that only part of the target trip price has been reserved through a shared arrangement. In such an instance, the guide is presented with additional features to accept (336h) or decline (336i) the adventure for less than the full target price. In the event that the guide accepts (336h), the reservation can stay available to other users on a shared basis, but the amount to reserve the shared reservation is reduced by the amount already pledged toward the adventure ($45 in this example). If no other users reserve the adventure 334, then the guide will be obligated to provide the adventure at the reduced price. If the event that the guide declines (336i), the instance of the post can reenter the pool of available reservations without the one partial reservation being applied to the adventure 334.

The example entry 338 is similar to the entry 334 in that it includes a shared reservation, but in this instance the corresponding information 340a-g indicates that the entire amount for the reservation has been met (340g), with one user paying $40 and the other user paying $59. The amount that users pay for shared reservations can be designated using any of a variety of schemes, including permitting users to submit user-designated amounts that they are willing to pay for a shared reservation.

Figure 3D:
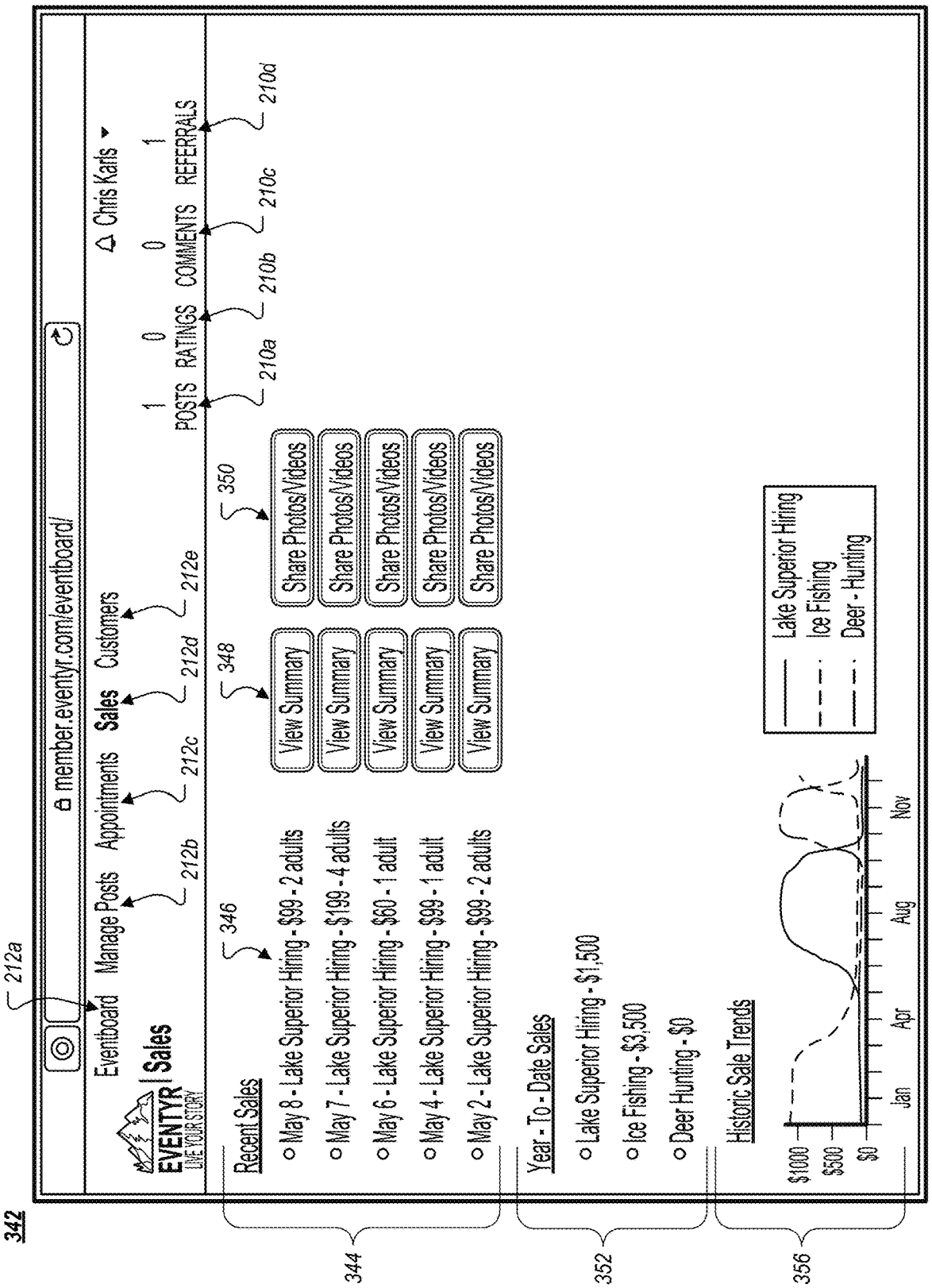
Figure 3E:
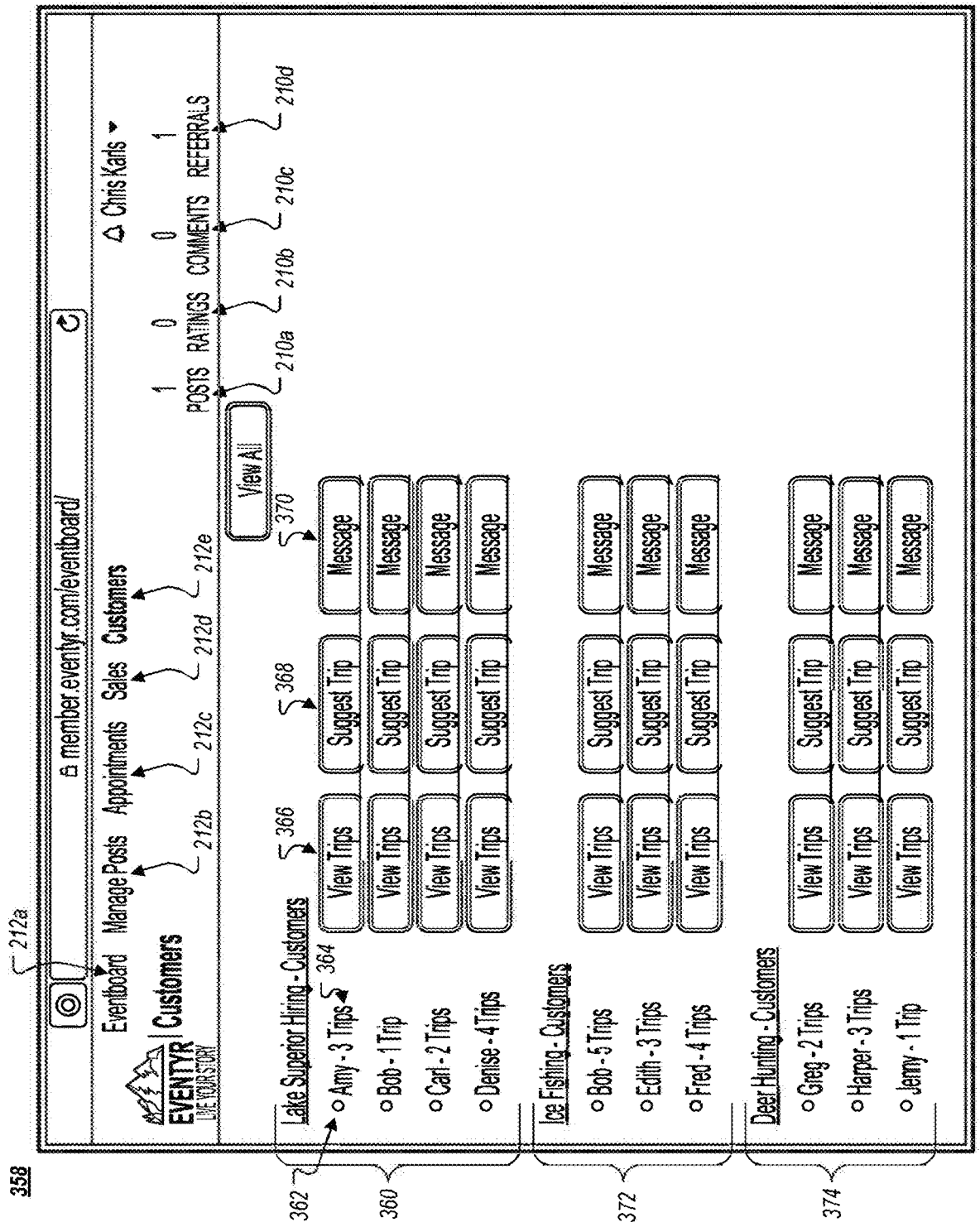

Referring to FIG. 3D, an example GUI 342 is depicted for reviewing and managing sales for a guide. As with the GUI 300, the GUI 342 includes the navigational links and summary information 210a-d and 212a-e described above with regard to FIGS. 2A-H, and additionally includes information on recent sales 344, year to date sales 352 for the guide's posts, and a graph 356 depicting sale trends over time for the guide's posts. The recent sales 344 include information 346 describing each of the recent sales, features 348 to view a more detailed summary, and features 350 to upload media (e.g., photos, videos) for the specific adventure that can be distributed to the users who participated in the adventure.

Referring to FIG. 3D, an example GUI 358 is depicted for reviewing and managing user relationships for a guide. As with the GUI 300, the GUI 358 includes the navigational links and summary information 210a-d and 212a-e described above with regard to FIGS. 2A-H, and additionally includes post-specific user information 360, 372, and 374 for the guide (users who have participated in adventures for the guide's posts). The example information includes a user identifier 362 (e.g., user name, username on the site), a trip summary 364 for the user (e.g., total number of trips taken by the user, total number of trips taken by the user with the guide), a feature 366 to view the trips that the user has taken, a feature 368 to suggest upcoming adventures for the user, and a feature 370 to message the user. The user information can be organized in other ways in the GUI 358, and can additionally/alternatively include features to search for or further filter users who are depicted in the GUI 358.

Referring now to FIGS. 4A-F, a set of example screenshots for a GUI can be used for users to identify and reserve available activities (such as guided adventures in this example) through an adventure management computer system, such as the computer system 102. The example GUIs can be provided on example user computing devices, such as the user computing devices 106. The depicted GUIs are example mobile aps being executed on, for example, mobile computing devices (e.g., IOS smartphones, ANDROID smartphones, tablet computing devices) that can be downloaded and installed on the user computing devices 106. The example mobile apps can include and use one or more types of code (e.g., executable binaries, markup code, scripts) that are executed/interpreted by the user computing devices 106 to provide the GUIs through synchronous and/or asynchronous requests transmitted to the computer system 102 over the network 108. Although the example GUIs depicted in FIGS. 4A-F are depicted as mobile apps, they can additionally and/or alternatively be implemented in other formats, such as for web applications downloaded by and executed/interpreted by web browser applications.

Figures 4A, 4B:
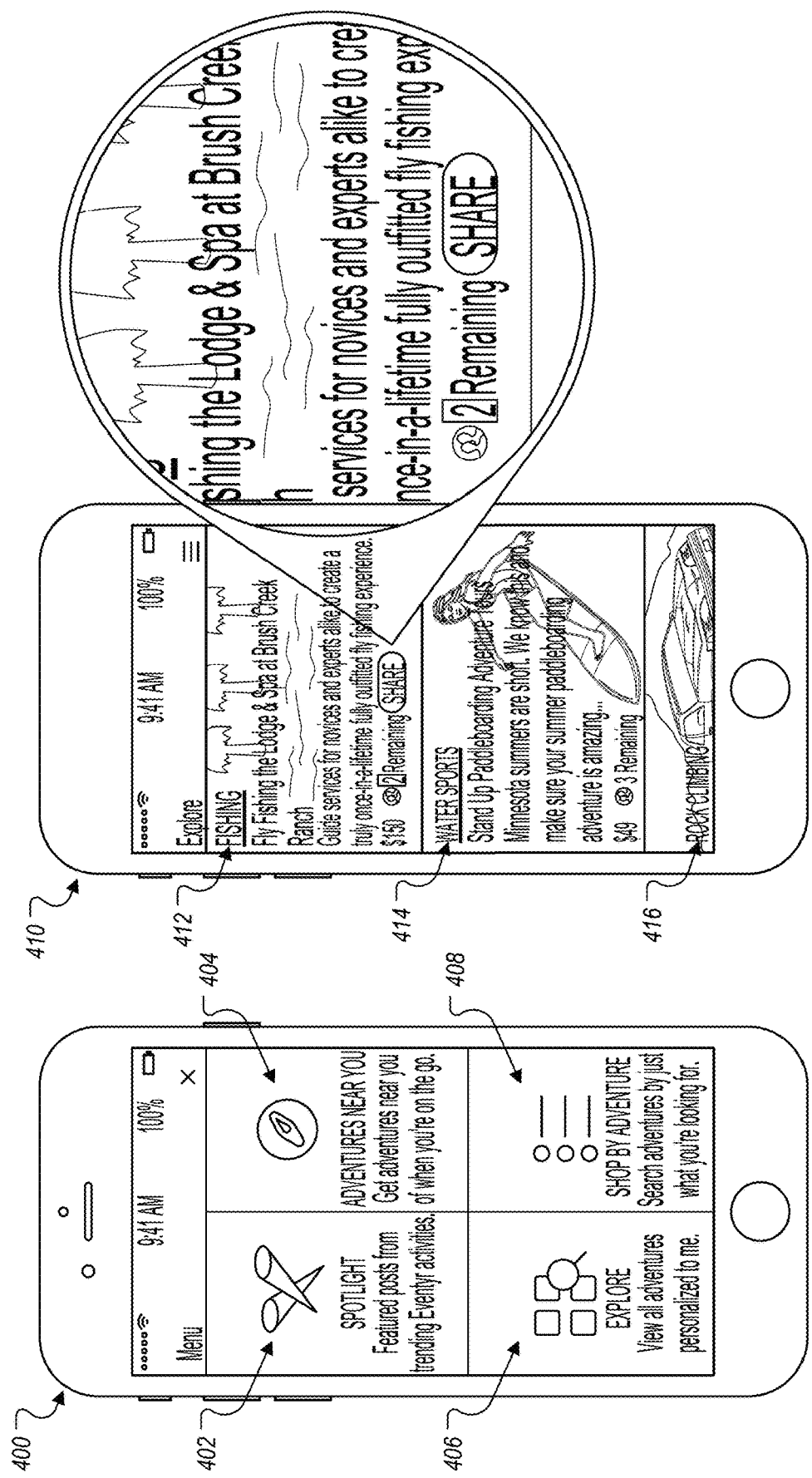
FIGS. 4A-F are a set of example screenshots for a GUI that can be used for users to identify and reserve available activities through an adventure management computer system.

Referring to FIG. 4A, an example GUI 400 is depicted with four different features through which a user can identify guided adventures to reserve. In particular, the GUI 400 includes a spotlight feature 402 that provides a selection of adventures that are currently popular (e.g., trending), a proximity finder feature 404 through which a user can locate adventures that are scheduled to occur near the user's current location, an explore feature 406 through which a user can explore adventures that have been identified as likely to be of interest to the user (e.g., determined by the computer system 102 to be of interest to the user based on the user's expressed interests, previous guided adventures, review/comments/ratings of previous adventures), and a search feature 408 through which a user can search for particular types of adventures (e.g., search by keyword, price, time, duration, location, type of adventure, group size, required experience level, physical activity).

Referring to FIG. 4B, an example GUI 410 is depicted for the explore feature 406. In this example, the user is presented with a list of adventures 412-416 that are determined to likely be of interest to the user. In particular, the adventures include a fly fishing adventure (412), a paddle boarding adventure (414), and a rock climbing adventure (416). The example fly fishing adventure 412 is identified as being a shared adventure with two spots remaining and with a remaining price of $150 (which can be based on the guide's target price minus the amount of shared reservations for the adventure already received). Selecting the fly fishing adventure 412 can transition to the GUI depicted in FIG. 4C.

Figure 4D:
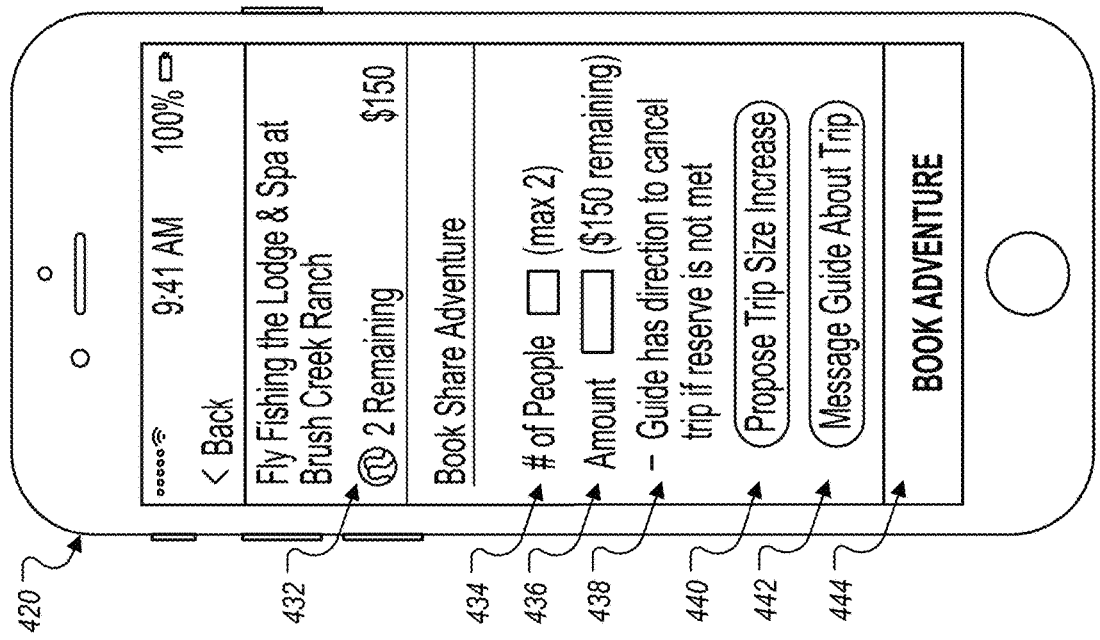
Figure 4C:
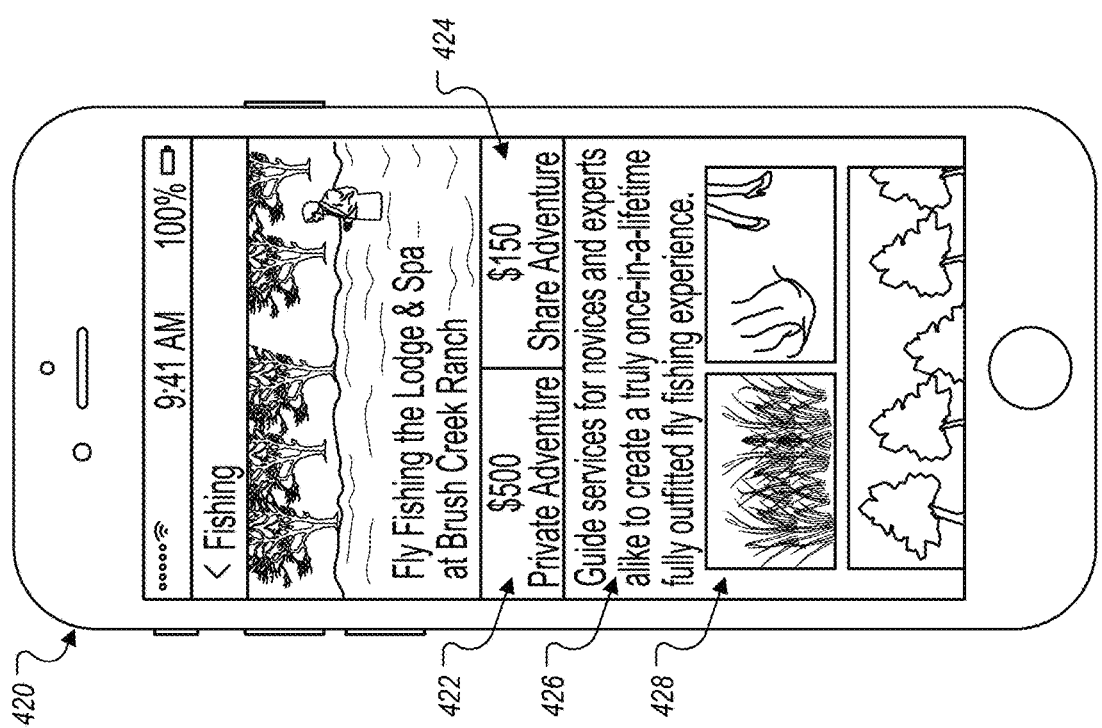

Referring to FIG. 4C, an example GUI 420 is depicted for the fly fishing adventure, with options to reserve the adventure without sharing (422) and to reserve a shared adventure (424). The GUI 420 also includes a description 426 of the adventure and photos 428 depicting the adventure. These can be materials that were uploaded by the guide for the trip through the interfaces described above with regard to FIGS. 2-3. Selecting the shared option 424 can transition to the GUI 430 depicted in FIG. 4D. Selecting the non-shared/private option 422 can transition to a GUI similar to the GUI 430 that is depicted in FIG. 4D, but without the features for designating a shared adventure (e.g., identifying a portion of the adventure price that the user would be interested in paying).

Referring to FIG. 4D, an example GUI 430 is depicted for reserving the shared experience on adventure 412. The GUI 430 includes information for reserving one or more spots on a shared adventure, including information 432 identifying a number of spots that are remaining on a shared adventure and a remaining amount of the adventure fee for the shared participants. The GUI 430 also includes features for reserving one or more spots on a shared adventure, such as a number of participants field 434 to designate a number of participants for the shared reservation, an amount field 436 to designate an amount the user is willing to pay to participate in the shared adventure (can be less than the remaining amount for the adventure), information 438 indicating that the guide has the discretion to accept or decline to provide the adventure if the total amount of the adventure fee is not met, a size increase feature 440 (e.g., selectable button) to propose an increase in the size of the trip to the guide, a messaging feature 442 (e.g., selectable button) to message the guide about the adventure, and a book feature 444 (e.g., selectable button) to proceed with the reservation as designated through fields 434-436. Although not depicted, the GUI 430 may additionally include features to view and select particular dates and times for the adventure (e.g., change to a different date from the selected date with only 2 spots remaining), including viewing availability for those other dates.

Selecting the size increase feature 440 can cause the client computing device to transmit an increase request to an adventure management computer system (e.g., computer system 102), which can retransmit the request to a client computing device associated with the guide along with selectable features for the guide to readily accept or decline the increase request, and to provide additional pricing information (e.g., price increase). As discussed above, the size increase may cause the pro rata price of the adventure to increase. The guide's response can be provided from the guide's computing device back to the computer system, and relayed back to the user's computing device and displayed in the GUI 430.

Selecting the messaging feature 442 can cause the client computing device to transmit a message to an adventure management computer system (e.g., computer system 102), which can transmit messages between the guide and the user without disclosing private information about the guide or the user, such as telephone numbers, user name, and/or other potentially sensitive information. Additionally and/or alternatively, selecting the messaging feature 442 may cause the client computing device to launch a messaging application (e.g., text messaging application) on the client computing device with an, at least partially, prefilled message to the guide, including information identifying the particular adventure that is of interest (e.g., description, URL for the adventure) and the guide's telephone number in the "to" field of the message.

Selecting the book feature 444 can cause the client computing device to transmit the reservation request and corresponding data fields to an adventure management computer system (e.g., computer system 102), which can book the reservation for the user. For logged-in users, the GUI 430 may not request additional user details, such as name, contact information, or payment information, to place the reservation, and may rely upon the adventure management computer system (e.g., computer system 102) to access such information from the user's account on the system when booking the reservation. Selecting the book feature 444 can cause the client computing device to transition to the GUI 450 depicted in FIG. 4E.

Figure 4F:
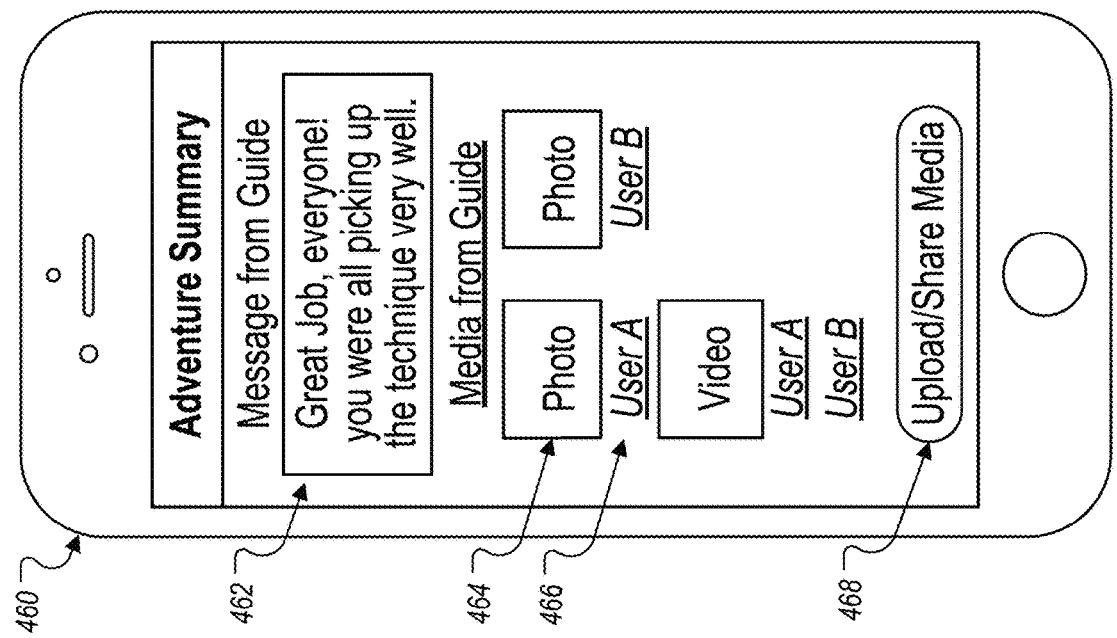
Figure 4E:
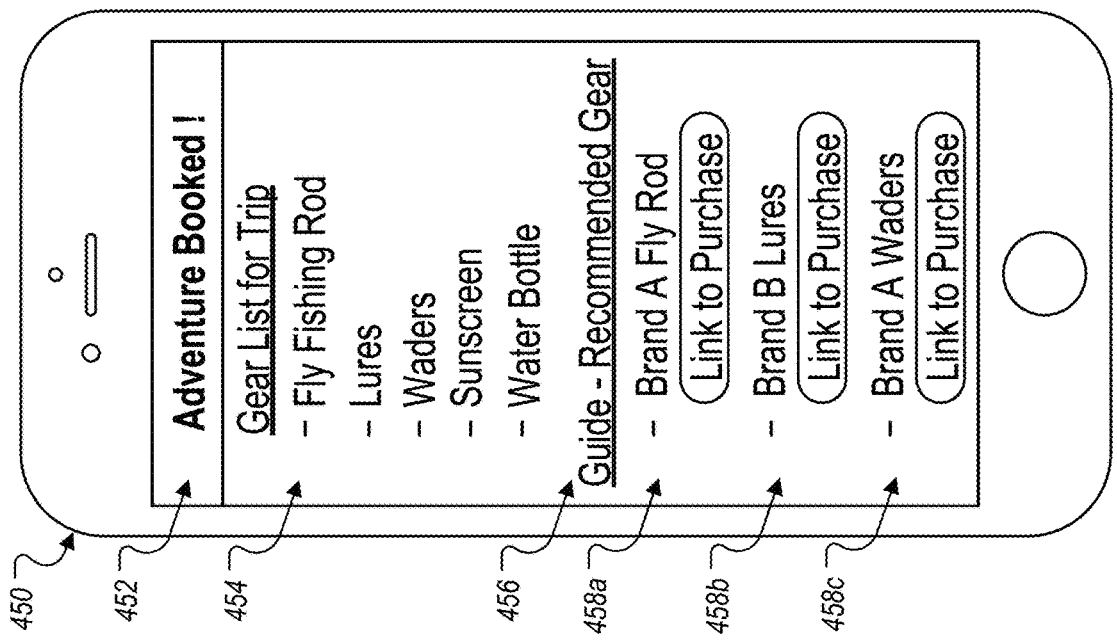

Referring to FIG. 4E, an example GUI 450 is depicted with reservation status information for the reservation and with gear information for the adventure. In particular, the GUI 450 includes reservation status information 452 that confirms that the adventure has been booked and a list of gear 454 that the user needs to bring to participate in the adventure. The GUI 450 also includes gear that the guide has recommended 456, which may be gear that the guide uses him/herself for the adventure (guide's gear kit for the adventure). The recommended gear 456 may be specific as to the make and model of the gear, whereas the needed gear 454 may be non-make/model specific. The recommended gear 456 can include links 458a-c to purchase on one or more third party merchant sites (e.g., merchant computer systems 124). The links 458a-c can be encoded with one or more data fields to uniquely identify the guide, the adventure management computer system, the particular adventure, the user, or any combination thereof, which may be used to apply discounts, preselect purchasing options, to allocate referral fees, and/or to provide other customizations related to the purchase.

Referring to FIG. 4F, an example GUI 460 is depicted with an adventure summary that users can receive during and/or after an adventure. The GUI 460 can include any of a variety of features, such as a textual summary 462 of the adventure from the guide and media 464 (e.g., photos, videos) from the adventure. The media 464 can include tags 466 that identify things in the media 464, such as one or more users who are present in each of the media items, locations that are depicted in the media items (e.g., locations where the pictures were taken), and/or activities that are depicted (e.g., start of adventure, casting, fish on line, end of adventure). Although not depicted, the GUI 460 can include features to permit the user to filter the media 464 based on various factors, such as filtering based on tags, types of media, and/or other factors. The tags 466 can be manually designated, such as by the guide and/or by the users who participated in the adventure. Features for manually designating tags for the media 464 can include a menu to select one or more tags for each media item 464, and features for bulk applying tags to multiple media item 464 at once. Additionally and/or alternatively, the tags 466 can be automatically applied to the media 464, such as through the use of facial recognition techniques seeded with user images (e.g., user profile photo on an adventure management system, photos in which user has been manually tagged), locations identified from metadata for photos/videos (e.g., geotagged locations that are encoded as metadata with photos/videos), and/or through automated scene/activity identification through object recognition techniques (e.g., techniques seeded with images that have been manually tagged for various activities/scenes).

The GUI 460 additionally includes a selectable feature 468 to upload and/or share media. Selection of the feature 468 can cause the client computing device to upload one or more local or remote media items (e.g., photos stored locally on the client computing device, photos stored on a remote data storage system that are accessible to the client computing device) for distribution to the guide and other users who participated in the adventure. Additionally and/or alternatively, selection of the feature 468 can allow for the user to download and/or share the media 464 with other people, such as through a messaging application on the client computing device and/or through one or more social networking applications on the client computing device.

The adventure summary in the GUI 460 may have a persistent URL assigned to it (so that it may be continually accessed over time) and access can be restricted to users who participated in the adventure. Some or all of the portions of the media 464 may additionally be viewable in association the guide's post for the adventure as examples of the experience users get on the adventure. The GUI 460 (and/or other GUIs not depicted) may include one or more fields for users to review the adventure, including fields to leave comments, provide reviews, and rate the adventure.

Figure 5:
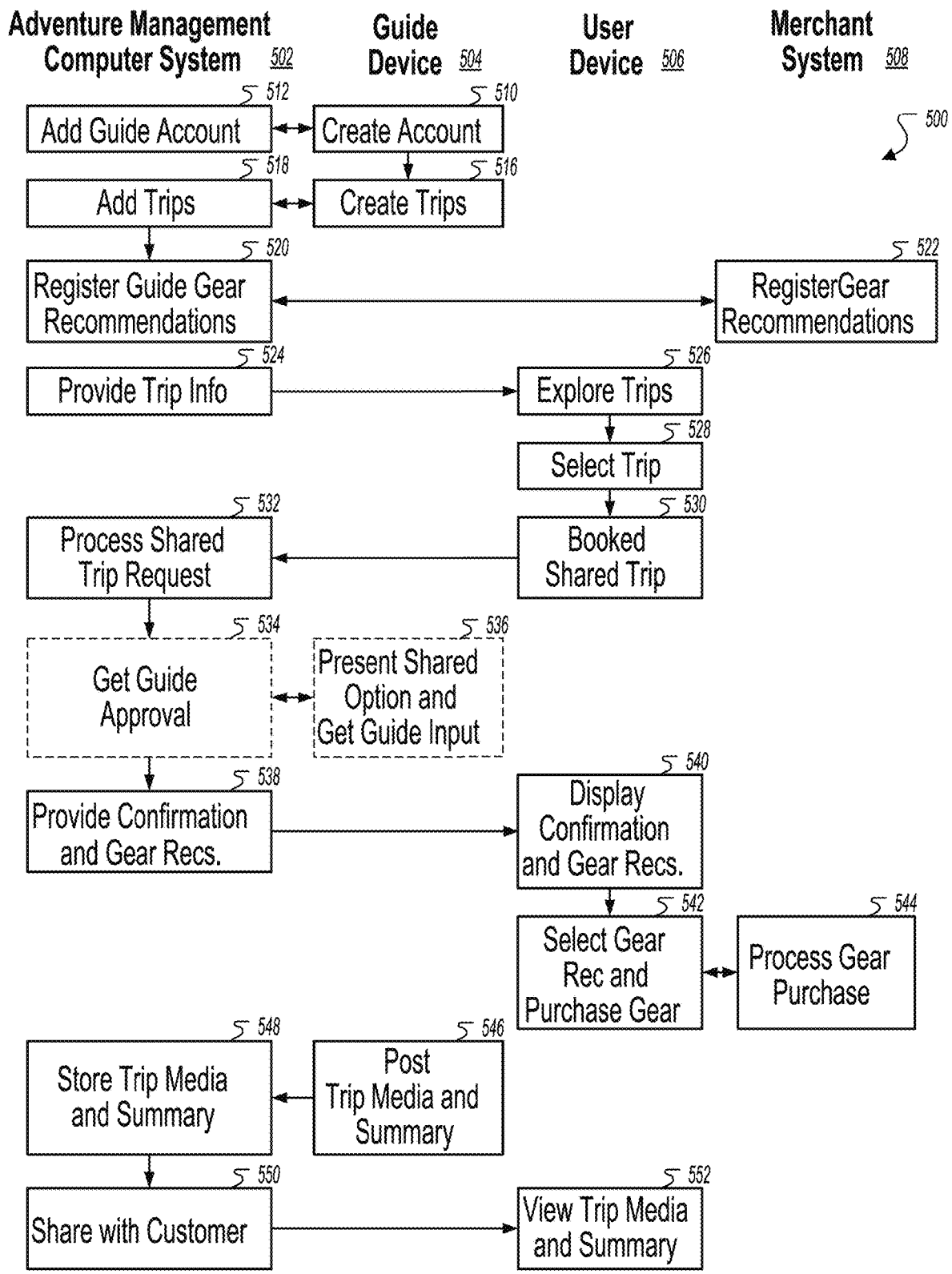

Referring now to FIG. 5, an example technique 500 can be implemented for posting, reserving, and summarizing available activities (such as outdoor guide adventures in this example) through an example adventure management computer system 502. Portions of the technique 500 can be performed by one or more computing devices/systems, such as the adventure management computer system 502 (e.g., computer system 102), a guide device 504 (e.g., guide computing devices 104), a user device 506 (e.g., user computing devices 106), and a merchant system 508 (e.g., merchant computer system 124).

The guide device 504 can create a guide account through a user interface provided on the guide device 504 (510), which can be processed by the computer system 502 to add an account for the guide to the system (512). With an account created, the guide can create outdoor trips/adventures (e.g., create posts) using a user interface on the guide device 504 (516), which can be added to a centralized repository of trips/adventures through communication with the computer system 502 (518). If the trip/adventure includes gear recommendations provided by the guide, the adventure management computer system 502 can register the guide's gear recommendations (52) with the merchant system 508 (522), which can include creating one or more unique identifiers (by the system 502 and/or the system 508) for the gear recommendations so that purchases based on the recommendations can be correctly identified and attributed to the guide and/or the system 502. Such unique identifiers can be stored by the computer system 502 and inserted into the trip/adventure created by the guide.

With a repository of trips/adventures, the system 502 can provide information about trips/adventures to the user device 506 (524), which can provide a user interface through which a user of the device 506 can view and explore the trips/adventures (526). The user can select a particular trip/adventure from the collection of trips/adventures that are presented (528) and can proceed to book the adventure, which in this example includes booking a shared adventure (530). Booking can include transmitting a request to book a shared adventure/trip to the computer system 502 (532), which can process the request. If the request is to deviate from the parameters for the adventure/trip designated by the guide, such as requesting an increase in the trip size or duration, or sharing the trip for less than the designated rice, a request can be transmitted to the guide device 502 for approval of the deviation (534), which can be presented to the guide on the guide device 504 for a response (536). Such a response can be retransmitted to the computer system 502 and, if the guide elects to permit the deviation (whether permanently or temporarily), conformation of the request can be provided by the computer system 502 (538), which can be received and displayed by the user device 506 (540). In addition to booking the adventure on the computing device 506, the user device 506 can receive and present gear recommendations for the adventure. Such gear recommendations can include URLs to purchase the recommended gear on the merchant system 508, and the URLs can include the one or more unique identifiers created by the system 502 and/or system 508 as part of the registration at steps 520-522. Selection of and purchase of a gear recommendation on the user device 506 (542) can cause the user device 506 to transmit requests to the merchant system 508 using the URLs and the one or more unique identifiers, which can be received and used by the merchant system 508 to process the purchase (544).

During and/or after the adventure/trip, the guide can post media and summaries for the adventure/trip using the guide device 504 (546), which can be received and stored by the computer system 502 (548) and shared with the users who participated in the adventure/trip (550). The user device 506 can receive and view the media and summaries of the adventure/trip (552).

Referring now to FIGS. 6A-D, 7A-G, 8A-D, and 9A-F, a set of example screenshots for a GUI can be used for users and/or guides to identify, reserve, view, and list available activities (such as guided adventures in this example) through an adventure management computer system, such as the computer system 102. The example GUIs can be provided on example user computing devices, such as the user computing devices 106 and/or the guide computing devices 104, and can be used in combination with the other GUIs described above. The depicted GUIs are example mobile apps being executed on, for example, mobile computing devices (e.g., IOS smartphones, ANDROID smartphones, tablet computing devices) that can be downloaded and installed on the guide computing devices 104 and/or the user computing devices 106. The example mobile apps can include and use one or more types of code (e.g., executable binaries, markup code, scripts) that are executed/interpreted by the guide computing devices 104 and/or the user computing devices 106 to provide the GUIs through synchronous and/or asynchronous requests transmitted to the computer system 102 over the network 108. Although the example GUIs depicted in FIGS. 6A-D, 7A-G, 8A-D, and 9A-F are depicted as mobile apps, they can additionally and/or alternatively be implemented in other formats, such as for web applications downloaded by and executed/interpreted by web browser applications.

Figure 6B:
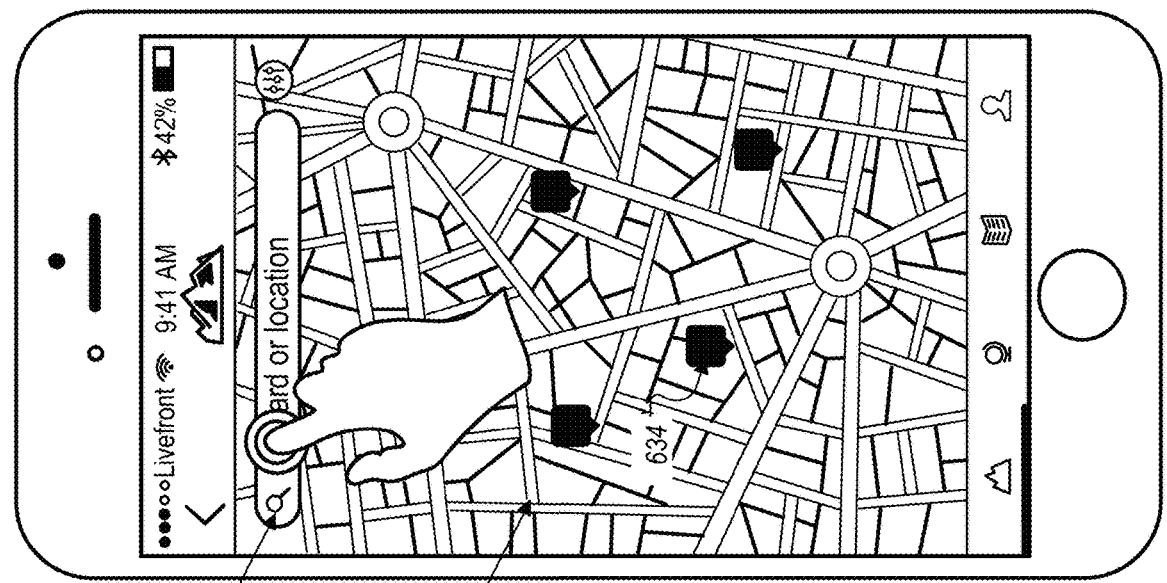
FIGS. 6A-D are a set of example screenshots for a GUI for exploring available adventures.
Figure 6A:
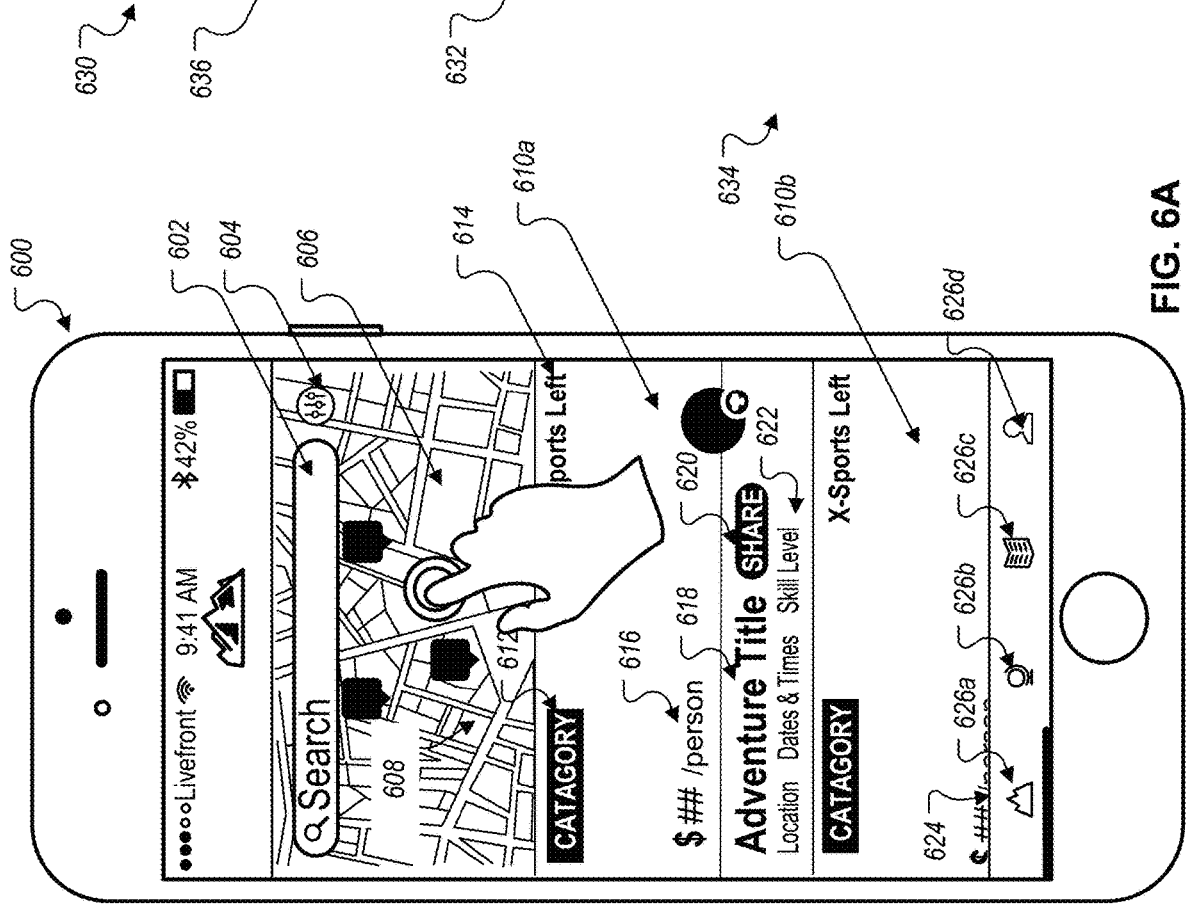

Referring to FIGS. 6A-D, example GUIs are depicted for exploring available adventures. FIG. 6A depicts an example GUI 600 that displays the available activities that satisfy one or more search criteria, such as proximity to a geographic location (e.g., user's current geographic location, user-selected geographic location), timeframe for the adventure (e.g., occurring within the next day, occurring next week), keywords and/or categories used to describe adventures, and/or other search criteria. The GUI 600 includes features for designating search criteria, such as a search bar 602 through which users can enter search terms (e.g., keywords, geographic locations) and a selectable icon 604 through which adventure parameters can be designated.

The GUI 600 includes features to assist a user in navigating available adventures, such as a map 606 depicting the locations of available adventures and a list 610a-b of the available adventures depicted in the map 606. The list 610a-b can be scrollable independent of the map 606 so that a user can scroll through the list 610a-b while still viewing the map 606. Selection of an icon designating an adventure location (e.g., starting or meeting point for the adventure) in the map 606, such as the icon 608, can cause the list 610a-b to be automatically scrolled to the list entry that corresponds to the adventure selected in the map 606. The list 610a-b contains current information for adventures, such as a category (612), number of remaining spots available (614), price per participant (616), adventure title (618), an indicator of whether the adventure is being shared (620), and information on the location, timeframe (e.g., dates and times), and skill level for the adventure (622). The entries in the list 610a-b can be selectable and can cause the GUI to present an interface to view additional adventure information and to book the selected adventure (see FIGS. 7C-G).

In some implementations, the GUI 600 is the default interface that is shown to users when first accessing or launching an adventure mobile app on the user computing devices 106, and can be programmed to display available adventures near the user's current location that are scheduled to take place in the near future (e.g., within the next day, next 3 days, next week). For example, a mobile app that is launched on a user computing device 106 can, in response to detecting that it is being launched, can obtain the current location of the user computing device 106 (user permission (persistent or per instance) may be needed to access the location information for the user computing device 106) and can transmit a search query to the adventure management system 102 for available activities occurring near the current location and in the near future. The adventure management system 102 can run the search, including accessing information in the data repository 122, and can return the results to the user computing device, which can display the results in the GUI 600.

The GUI 600 (as well as several of the other GUIs described with regard to FIGS. 6A-D, 7A-G, 8A-D, and 9A-F) includes a footer 624 with selectable icons 626a-d that can be used to navigate between different features. The icon 626a corresponds to a search-based interface (e.g., keyword search, location search) for identifying and booking available adventures (see FIGS. 6A-D), the icon 626b corresponds to a collection-based interface (e.g., collections of adventures based on categories) for exploring and identifying available adventures (see FIGS. 7A-G), the icon 626c corresponds to a passbook interface for viewing upcoming and previous adventures (see FIGS. 8A-D), and the icon 626d corresponds to a profile interface for viewing user information (e.g., logged-in user profile, adventure provider profiles, other user profiles) and adventures associated with the user (e.g., adventures that the user has taken, adventures that the adventure provider has provided). Selection of the icons 626a-d can transition the user computing device to corresponding GUIs.

An example user selection of the map 606 in the GUI 600 is depicted in FIG. 6A, which can cause an example GUI 630 in FIG. 6B to be displayed, which depicts an a map 632 of available activities (e.g., the activity 634) that satisfy one or more search criteria, which can include a geographic area that is displayed in the GUI 630. A user can pan and zoom in the map 632, which can cause the search criteria and the results to be updated based on the area that is currently being displayed. The GUI 630 also includes a search toolbar 636, similar to the search bar 602, to enter search terms.

Figures 6C, 6D:
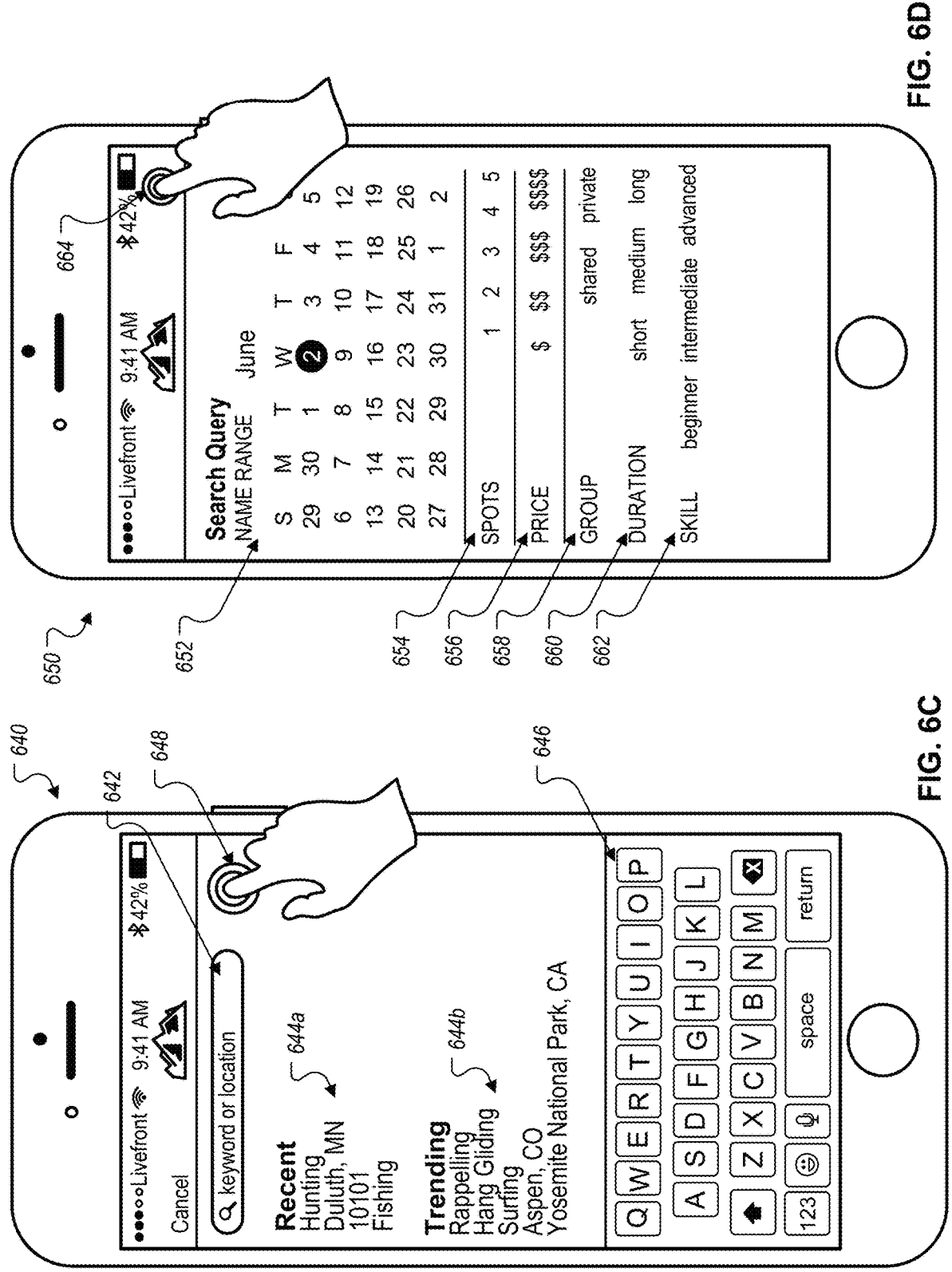

An example user selection of the search bar 636 in the GUI 630 is depicted in FIG. 6B, which can causes the example GUI 640 in FIG. 6C to be presented, and through which search criteria can be entered and/or selected. For example, a user enter textual search criteria (e.g., keyword, location) into the search bar 642 through selection of one or more suggested criteria 644a-b and/or through a keyboard interface 646 (which can also include a speech to text module to permit speech-based input). The suggested criteria 644a-b include recent searches conducted by the user and/or on the user computing device 106 (644a) and searches that are currently trending (e.g., threshold level of popularity and/or frequency over a recent period of time (e.g., over the past 15 minutes, 20 minutes, 45 minutes, hour, day) across a group of other users (644b), such as all other users, other users located near the user (e.g., same state, same country), and/or other users with the same or similar interests (e.g., user-designated interests). The GUI 640 also includes a selectable button 648 to designate other adventure parameters.

An example user selection of the button 648 is depicted in FIG. 6C, which can causes an example GUI 650 in FIG. 6D depicts to be presented through which a user can designate adventure parameters, such as a date range (652), minimum number of remaining spots available (654), price (656), group designation as to whether the adventure is private or shared with other groups (658), duration (660), and skill level (662). The GUI 650 also includes a selectable button 664 through which a user can indicate that they have completed entering the adventure parameters. The adventure parameters entered through the GUI 650 and/or the search query entered through the GUI 640 can be used to run a search for available adventures, which can be presented to a user in the GUI 600, the GUI 630, and/or other interfaces described throughout this document.

Referring to FIGS. 7A-G, example GUIs are depicted for exploring and reserving available adventures through collection-based groupings. Collections include one or more adventures that are grouped together based on one or more common features, such as the adventure category or type (e.g., hunting, fishing, hiking), location, price, adventure provider, skill level, required gear, or combinations thereof. Collections can be global (i.e., same collections used for all users) and/or individualized for users, for example, based on various user-specific factors, such as user preference, identified skill levels in various types of activities, previous adventures, and/or other user-specific factors.

Figures 7A, 7B:
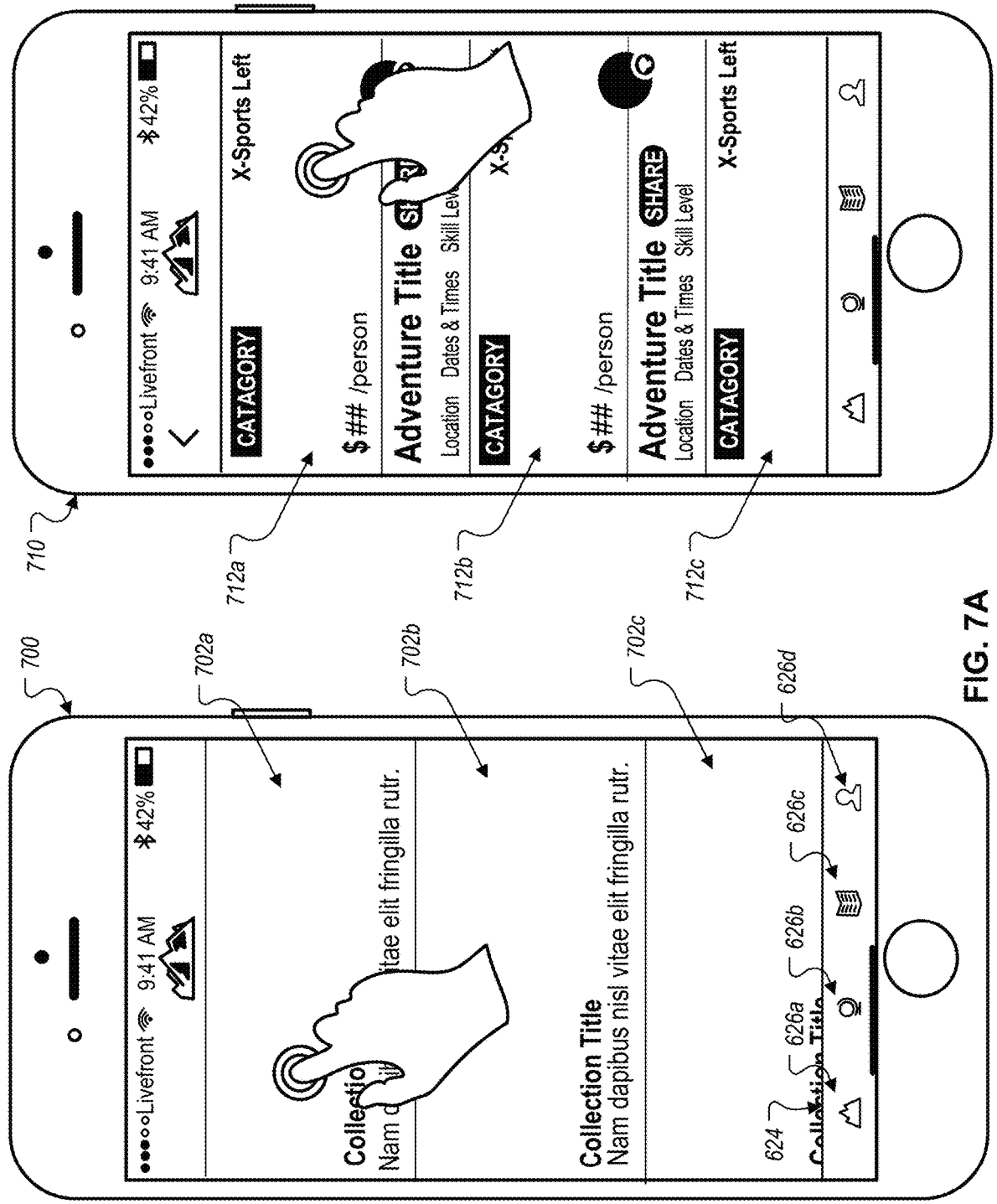

Referring to FIG. 7A, which depicts an example GUI 700 showing example adventure collections 702a-c. A user can navigate to the GUI 700, for example, by selecting the collection icon 626b. A user can select a collection, such as the example user selection of the first collection 702a that is depicted in FIG. 7A.

Referring to FIG. 7B, which depicts an example GUI 710 that can present a list of available adventures 712a-c that are included in the example collection 702a selected in FIG. 7A. The available adventures 712a-c are the same as or similar to the adventures 610a-b described above with regard to FIG. 6A. A user can select the adventures 712a-c to view additional information and to reserve the adventure, as depicted by the user selecting the example adventure 712a in FIG. 7B.

Referring to FIGS. 7C-D, which depicts an example GUI 720 displaying the example adventure selected in FIG. 7B. FIG. 7C shows the default top view of the adventure and FIG. 7D shows the user having scrolled down to view additional details in the GUI 720 regarding the adventure. The GUI 720 includes a variety of features that present information about the adventure, such as the adventure category (728), a space for images depicting the adventure (730), an image status indicator indicating which of multiple images in a sequential horizontal image scroll is currently being presented (732), a number of remaining spots available (726), a price for the adventure (734), a title/name of the adventure (740), an indicators as to whether or not the adventure is shared (742), an image of the adventure provider (e.g., guide) (736), accolades (e.g., awards, ratings, reviews) for the adventure provider (738), a location for the adventure (744), time and date for the adventure (746), a number of remaining spots (748), a user skill level for the adventure (750), a textual description of the adventure (752), requirements for the adventure (e.g., gear requirements, skill requirements) (756), and licenses to participate in the adventure (758). The GUI 720 also includes a persistent button 754 (not scrolled) to book a reservation, and selectable features to share information on the adventure (e.g., publish to social media, email, text message, add reminder to calendar) (722) and to watch/be reminded of the adventure (e.g., create email reminder for adventure based on availability becoming limited) (724). A user is selecting the book button 754 in the example depicted in FIG. 7D, which can cause the booking interface depicted in FIG. 7E to be presented.

Figures 7E, 7F:
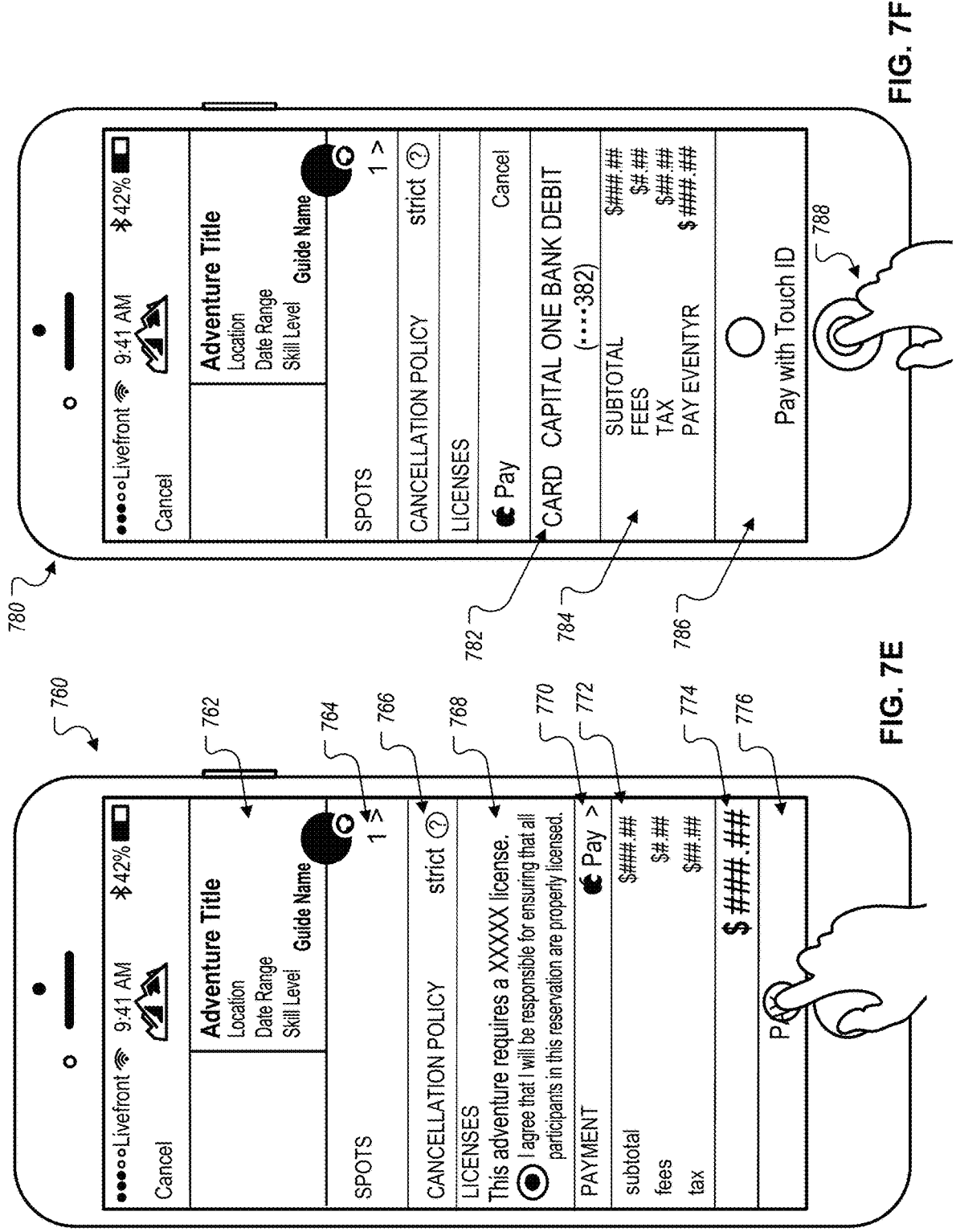

Referring to FIG. 7E, which depicts an example GUI 760 for booking the adventure selected in in FIG. 7D. The GUI 760 provides information summarizing the adventure that is being booked (762), an interface to select a number of spots that will be reserved (764), information summarizing the cancellation policy for the adventure as well as a button (the "?" button) to view the full cancellation policy (766), information describing license requirements for the adventure and a confirmation/consent feature (e.g., radio button, checkbox, text field for user initials, verified user identity feature (e.g., biometric verification, facial recognition, voice recognition)) for a user to confirm/consent to compliance with the license requirement in advance of the adventure (768), a feature to select payment (e.g., credit card, APPLE PAY) for the adventure (770), accounting information to identify all costs associated with the adventure (772), a total cost field (774), and a selectable button to confirm payment for the adventure (776). A user is depicted in the example as selecting the pay button 776 depicted in FIG. 7E, which can cause the payment confirmation interface depicted in FIG. 7F to be presented.

Referring to FIG. 7F, which depicts an example GUI 780 for confirming payment information for the adventure being booked in FIG. 7E. The GUI 780 includes a field to designate a payment source (e.g., particular credit card or other payment account) for the payment (782), accounting and total price information for the adventure (784), and information indicating how payment is being confirmed (786), which in this example is through a biometric sensor (e.g., fingerprint reader) on the computing device (788). In the depicted example in FIG. 7F, a user is scanning his/her finger on the biometric sensor, which the computing device can use to confirm the user's identity and to process payment for the adventure with the computer system.

Figure 7G:
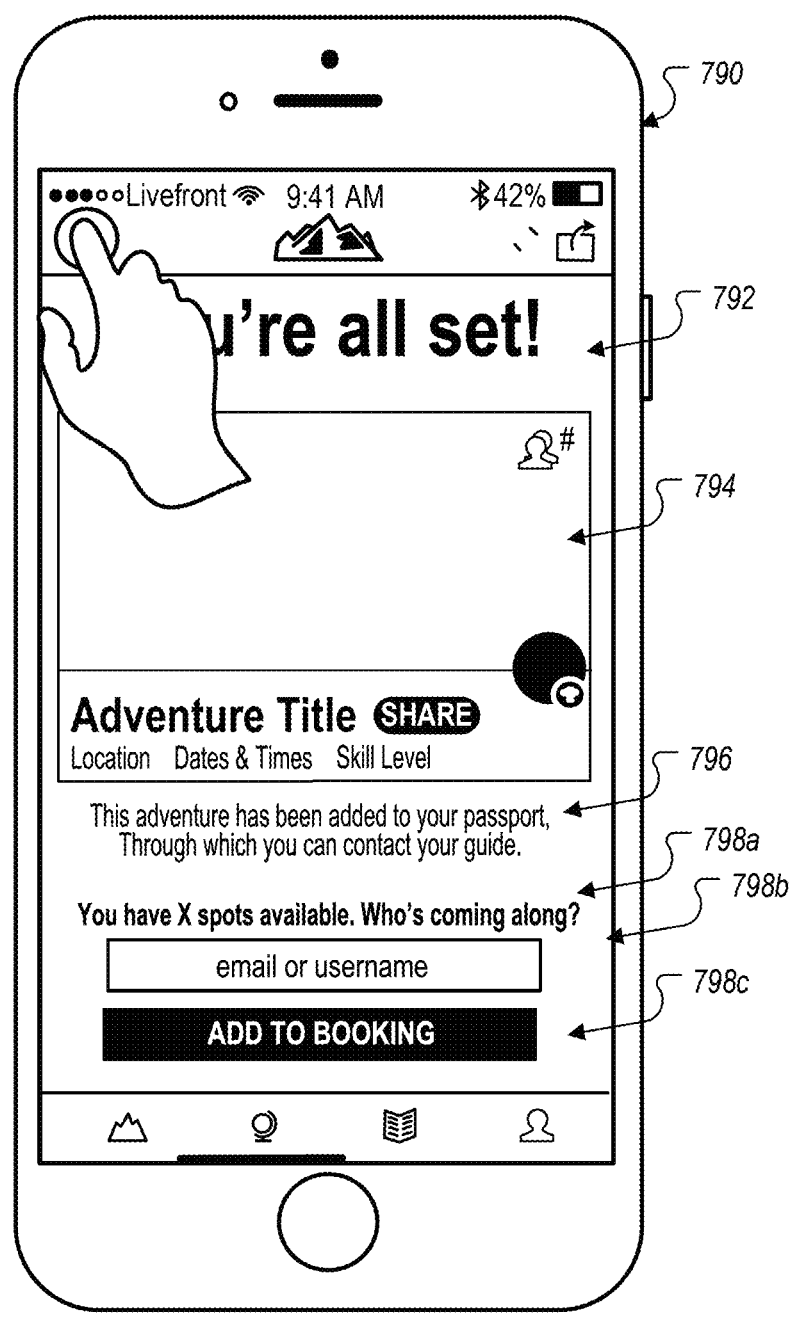

Referring to FIG. 7G, an example GUI 790 is depicted to confirm the reservation for the adventure paid for in FIG. 7F. The example GUI 790 includes information confirming that the adventure has been booked (792), a summary and link to additional information (e.g., selectable link to view the adventure information described in FIGS. 8B-D) about the adventure (794), information describing that the adventure has been added to the user's passport (described in FIGS. 8A-D) (796), and features to add other users to the reservation (798a-c), which includes information identifying a number of spots that are available for other participants (798a), a field to enter an email address or username for other users who will be participating (798b), and a button to add the users identified in the field 798b to the reservation (798c).

Referring to FIGS. 8A-D, example GUIs are depicted for viewing a user/adventure provider passport, which provides information on upcoming and past adventures for a user and/or for an adventure provider. Passports can be a way for users and adventure providers to manage their current and past adventures through the computer system 102.

Referring to FIG. 8A, an example GUI 800 provides a passport interface for a user and/or adventure provider. A user or adventure provider can navigate to the GUI 800, for example, by selecting the passport icon 626c. The GUI 800 includes an upcoming adventure area 802 that lists upcoming adventures for the user/adventure provider who is logged into the computing device, and a past adventure area 806 that lists past adventures that the user/adventure provider has participated in/provided. An example upcoming adventure 804 is depicted in the upcoming adventure area 802, and an example past adventure 808 is depicted in the past adventure area 806. The GUI 800 can be scrollable so that multiple upcoming and/or past adventures are able can be viewed. Selection of the adventures listed in the GUI 800, such as the upcoming adventure 804 and/or the past adventure 808, can cause an interface to be presented with information for the selected adventure. In this example, user is selecting the adventure 804, which causes the interface depicted in FIGS. 8B-D to be presented.

Referring to FIGS. 8B-D, an example GUI 810 is presented for the upcoming adventure selected in FIG. 8A. FIG. 8B shows a top of the GUI 810, FIG. 8C shows a middle portion of the GUI 810 (scrolled down from FIG. 8A), and FIG. 8D shows a bottom portion of the GUI 810 (scrolled down from FIG. 8B). The GUI 810 includes information for the selected adventure, such as images (812) that can be toggled through as indicated by an image status indicator indicating which of multiple images in a sequential horizontal image scroll is currently being presented (814), an adventure provider for the adventure (816), a title (818), an indicator as to whether the adventure is shared or private (820), location information (822), time and date information (824), a number of remaining spots available (826), and a skill level for the adventure (828). The GUI 810 also includes features to add other users to the reservation, including a prompt 830 to add users to the reservation, a field 832 to designate other users for the adventure, and a button 834 to add the designated users for the adventure. After being added to an adventure, the added user may need to confirm the addition, which can include confirmation through the interfaces depicted in FIGS. 7C-G, to be added to the adventure. The GUI 810 provides status information for other users invited/added to an adventure, including information identifying users who have accepted (836) and users for whom confirmation is still pending (838).

The GUI 810 further includes a description of the adventure (840), requirement information for the adventure (842), licenses that are required for the adventure (which the user has consented/confirmed he/she will have in place when the adventure takes place) (844), and the cancellation policy (846). The GUI 810 additionally includes a button 848 to contact the adventure provider (e.g., guide), such as through a messaging system that is part of the application (e.g., messaging feature included in the application) and/or separate from the application (e.g., text messaging application, email application). The GUI 810 further includes features to modify the reservation, such as a button to cancel the reservation (850), which may be cancelled according to the cancellation policy (e.g., forfeit of deposit, payment of full reservation if cancelled less than a threshold amount of time before the adventure). Other modification features are also possible, such as increasing the number of participants for the reservation and/or increasing the group size for the adventure.

Referring to FIGS. 9A-F, example GUIs are depicted for user and/or adventure provider profiles, which can include viewing user/adventure provider information as well as adventures that the user/adventure provider have participated in/provided. FIGS. 9A-F additionally depict example interfaces for adventure providers to create and post new adventures through the computer system 102.

Figure 9B:
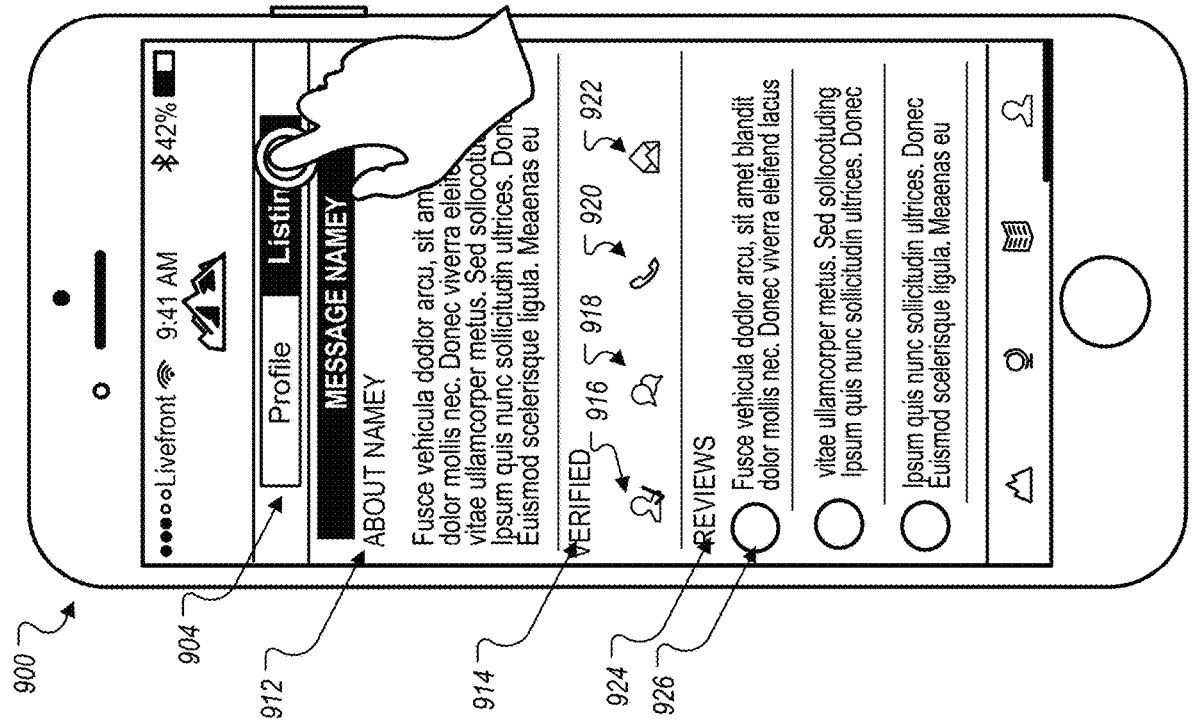
Figure 9A:
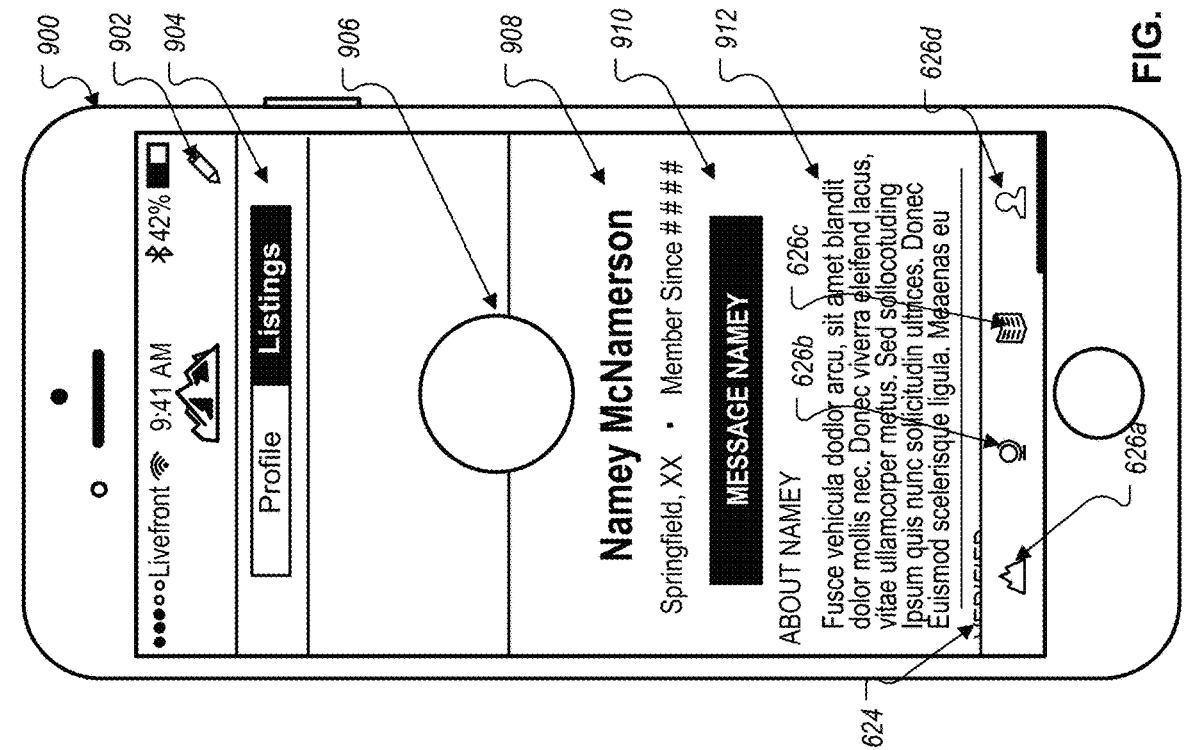

Referring to FIGS. 9A-B, an example GUI 900 provides an interface for viewing the profile of a user or an adventure provider. The GUI 900 can be used to view the profile of the user/adventure provider who is logged-in to the computing device, and can be used to view the profile of another user/adventure provider. A user or adventure provider can navigate to the GUI 900 in a number of ways, such as by selecting the profile icon 626d and/or selecting a selectable element (e.g., image, name, username) depicted in other GUIs (e.g., GUIs depicted in FIGS. 6A-D) and/or included in other applications (e.g., links provided via text message or email) for other users/adventure providers.

In the depicted example, the GUI 900 is presented from the view of a logged-in adventure provider, who is presented with his/her profile as it would be viewed by users and/or other adventure providers. As described above, the GUI 900 can be applied to users as well. The GUI 900 includes an edit feature 902 that can be selected to make the various fields and information in the GUI 900 editable for the adventure provider. The GUI 900 includes selectable options 904 to view the adventure provider's profile or associated listings for the adventure provider. In this example, the profile option is selected. The GUI 900 includes one or more images (906), the adventure provider's name and associated details (e.g., location, start of membership) (908), a button to contact the adventure provider (910), a textual biography for the adventure provider (912), verified information for the adventure provider (914), and reviews of the adventure provider by users who have participated on his/her adventures (924). The verified information (914) includes a user identifier for the adventure provider (916), reviews for the adventure provider (918), a telephone number/link for the adventure provider (920), and an email address/link for the adventure provider (922). Selecting the reviews button (918) can present the reviews (924) in the GUI 900 (e.g., scroll to the reviews 924, expand the reviews 924). Selecting the telephone button (920) can automatically launch a telephone application with the adventure provider's telephone number entered into the recipient field. Selecting the email button (922) can automatically launch an email application with the adventure provider's email address automatically entered into the "To" field and a default title automatically entered into the "Title" field (e.g., default title of "Adventure provider inquiry"). The reviews 924 can include information identifying the reviewer (as well as a selectable link to the reviewer's profile) and the review, which may include textual comments, ratings, and/or other information. User input selecting the listings feature (904) is depicted as being provided through the GUI 900 in FIG. 9B, which can cause the interface depicted in FIG. 9C to be displayed.

Referring to FIG. 9C, an example GUI 930 is depicted that lists adventures 934a-c that are associated with the logged-in adventure provider. These adventures 934a-c can include upcoming adventures that are currently scheduled to take place, which can be organized, for example, in chronological order (with the adventure that will occur the soonest being listed first). The GUI 930 can be used by an adventure provider to view the status of and to manage his/her upcoming adventures. The GUI 930 additionally includes a button 932 to add new adventure listings through the computer system 102. User input selecting the button 932 is depicted in FIG. 9C, which can cause the computing device to display the interface depicted in FIGS. 9D-E.

Referring to FIGS. 9D-E, an example GUI 940 is depicted for adding a new adventure to the adventures provided by the computer system 102. The GUI 940 includes a number of fields that an adventure provider can fill out for an adventure, including a title (942), location (944), category/type for the adventure (946), start day/time for the adventure (948), end day/time (950), a textual description (952), media (e.g., images, videos) depicting the adventure (954), a maximum number of spots available for the adventure (956), a total price for the adventure (958), an indication of whether the adventure is shareable across multiple different parties (960), a cancellation policy (962), a skill level for the adventure (964), requirements to participate in the adventure (966), and licenses that are required for the adventure (968). A number of the fields in the GUI 940 include enumerated lists with a few options that the adventure provider can select from, such as the cancellation policy, skill level, requirements, and licenses fields 962-968, which can improve the GUI 940 for creating the adventure and can improve data uniformity across adventures, which can make searching by users more robust. The GUI 940 also includes a button 970 that a user can select to publish the created adventure. Example user input selecting the button 970 is depicted, which can cause the adventure provider computing device 104 to transmit the information entered through the GUI 940 to the computer system 102, which can process and add the adventure to the repository of adventures so that it is discoverable and able to be reserved by users.

Referring to FIG. 9F, an example GUI 980 depicting the example adventure added through the GUI 940. The GUI 980 can be presented to the adventure provider in response to the adventure provider selecting the publish button 970 in the GUI 940 (and upon confirmation by the computer system 102 that the adventure has been successfully added to the adventure offerings provided by the system 102). The GUI 980 includes a view of the adventure as users and other adventure providers would see it (similar to the features described above with regard to FIGS. 7C-D) as well as additional features 982-984 for the adventure provider to further edit the adventure (982) and to share the adventure (984). Selecting the edit feature 982 can return to the GUI 940 with the fields prefilled with the current values for the adventure. Selecting the share feature 984 can provide an interface for the adventure provider to share information for the adventure and a link to view the adventure (e.g., view on a mobile app, view on a website) across any of a variety of platforms, such as social networks, messaging platforms, and/or advertising platforms.

Figure 10:
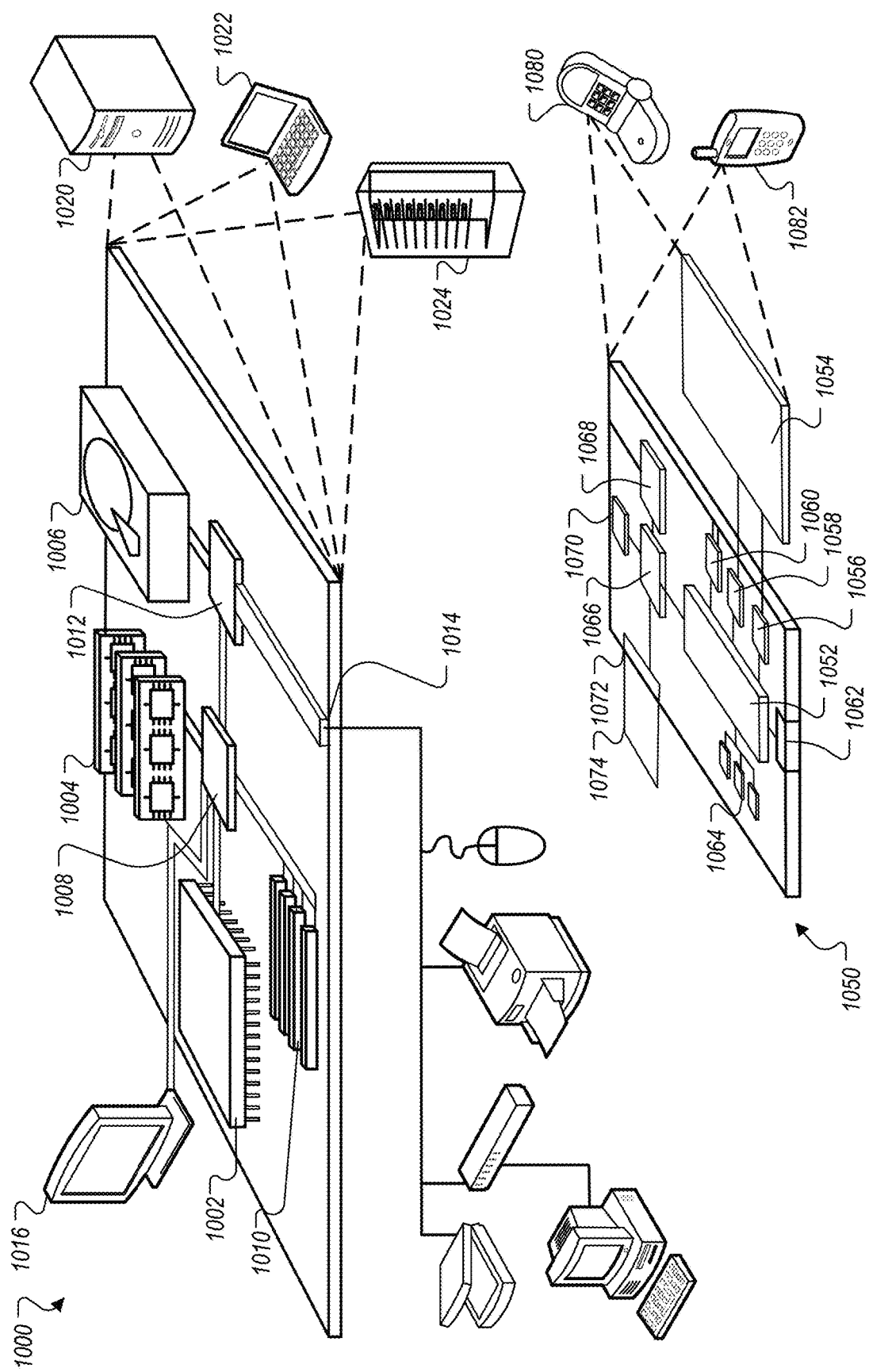
FIG. 10 is a block diagram of example computing devices.

FIG. 10 is a block diagram of computing devices 1000, 1050 that may be used to implement the systems and methods described in this document, as either a client or as a server or plurality of servers. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. Additionally computing device 1000 or 1050 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT (Thin-Film-Transistor Liquid Crystal Display) display or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices.

External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052 that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method of improved navigation of selectable adventures in a location-based guide-pairing computer system, comprising:

transmitting a request, from an end user mobile device to an adventure management server system, for reservable adventures that are scheduled to occur in proximity to an automatically detected geographic location of end user mobile device;

in response to receiving a resulting set of reservable adventures from the adventure management server system, simultaneously displaying upon a touchscreen of the end user mobile device a scrollable list of the resulting set of reservable adventures and an interactive user-adjustable map that depicts both the automatically detected geographic location of end user mobile device and location identifiers of one or more of the resulting set of reservable adventures;

in response to a touchscreen selection of one of the location identifiers corresponding to one of the resulting set of reservable adventures displayed on the interactive user-adjustable map of the touchscreen of the end user mobile device, automatically scrolling the simultaneously displayed scrollable list of the resulting set of reservable adventures to display a list entry corresponding to said one of the resulting set of reservable adventures displayed on the interactive user-adjustable map; and in response to a touchscreen selection of said list entry corresponding to said one of the resulting set of reservable adventures displayed on the interactive user-adjustable map of the touchscreen of the end user mobile device, displaying an adventure detail user interface at the touchscreen of the end user mobile device that prompts a user to reserve said one of the resulting set of reservable adventures, wherein the adventure detail user interface at the touchscreen of the end user mobile device further displays at least one of a guide profile information or a selectable option for a shared adventure so that a price is eligible to be shared by multiple users.

2. The method of claim 1, wherein said automatically scrolling to display the list entry comprises displaying, contemporaneously with the interactive user-adjustable map on the touchscreen of the end user mobile device, list entry information comprising at least an adventure title, a number of remaining spots available, and timeframe information corresponding to said one of the resulting set of reservable adventures.

3. A method of improved navigation of selectable adventures in a location-based guide-pairing computer system, comprising:

transmitting a request, from an end user mobile device to an adventure management server system, for reservable adventures that are scheduled to occur in proximity to an automatically detected geographic location of end user mobile device;

in response to receiving a resulting set of reservable adventures from the adventure management server system, simultaneously displaying upon a touchscreen of the end user mobile device a scrollable list of the resulting set of reservable adventures and an interactive user-adjustable map that depicts both the automatically detected geographic location of end user mobile device and location identifiers of one or more of the resulting set of reservable adventures; and in response to a touchscreen selection of one of the location identifiers corresponding to one of the resulting set of reservable adventures displayed on the interactive user-adjustable map of the touchscreen of the end user mobile device, automatically scrolling the simultaneously displayed scrollable list of the resulting set of reservable adventures to display a list entry corresponding to said one of the resulting set of reservable adventures displayed on the interactive user-adjustable map, wherein said automatically scrolling to display the list entry comprises displaying, contemporaneously with the interactive user-adjustable map on the touchscreen of the end user mobile device, list entry information including an adventure title, a number of remaining spots available, timeframe information corresponding to said one of the resulting set of reservable adventures, and a price corresponding to said one of the resulting set of reservable adventures.

4. The method of claim 3, further comprising, in response to a touchscreen selection of said list entry corresponding to said one of the resulting set of reservable adventures displayed on the interactive user-adjustable map of the touchscreen of the end user mobile device, displaying an adventure detail user interface at the touchscreen of the end user mobile device that prompts a user to reserve said one of the resulting set of reservable adventures.

5. The method of claim 3, wherein each of the reservable adventures in the resulting set of reservable adventures from the adventure management server system includes a respective list entry information including at least the adventure title, the number of remaining spots available, the timeframe information, a price, and a skill level.

6. The method of claim 3, wherein the respective list entry information for each of the reservable adventures in the resulting set of reservable adventures from the adventure management server system is corresponds to a respective one of a plurality of independent adventure providers that upload and manage reservable adventures of the adventure management server system.

7. The method of claim 3, wherein the resulting set of reservable adventures from the adventure management server system is filtered based upon at least: location information, dates, and range of costs.

8. The method of claim 3, wherein the automatically detected geographic location of end user mobile device is identified after launching an adventure reservation mobile application at the end user mobile device.

9. A method of improved navigation of selectable adventures in a location-based guide-pairing computer system, comprising:

transmitting a request, using adventure reservation mobile application of an end user mobile device, to an adventure management server system for reservable adventures within designated geographic area;

in response to receiving a resulting set of reservable adventures from the adventure management server system, simultaneously displaying in a graphic interface of the adventure reservation mobile application of the end user mobile device a scrollable list of the resulting set of reservable adventures and an interactive user-adjustable map that depicts one or more location identifiers corresponding to one or more of the reservable adventures of the resulting set within the designated geographic area;

in response to a selection of one of the location identifiers corresponding to one of the resulting set of reservable adventures displayed on the interactive user-adjustable map of the graphic interface of the adventure reservation mobile application of the end user mobile device, automatically scrolling the simultaneously displayed scrollable list of the resulting set of reservable adventures to display a list entry corresponding to said one of the resulting set of reservable adventures displayed on the interactive user-adjustable map; and in response to a selection of said list entry corresponding to said one of the resulting set of reservable adventures displayed on the interactive user-adjustable map of the graphic interface of the adventure reservation mobile application of the end user mobile device, displaying an adventure detail user interface at the graphic interface of the adventure reservation mobile application of the end user mobile device that prompts a user to reserve said one of the resulting set of reservable adventures, wherein the adventure detail user interface at the graphic interface of the adventure reservation mobile application of the end user mobile device further displays at least one of a guide profile information or a selectable option for a shared adventure so that a price is eligible to be shared by multiple users.

10. The method of claim 9, wherein said automatically scrolling to display the list entry comprises displaying, contemporaneously with the interactive user-adjustable map on the graphic interface of the adventure reservation mobile application of the end user mobile device, list entry information comprising at least an adventure title, a number of remaining spots available, and timeframe information corresponding to said one of the resulting set of reservable adventures.

11. A method of improved navigation of selectable adventures in a location-based guide-pairing computer system, comprising:

transmitting a request, using adventure reservation mobile application of an end user mobile device, to an adventure management server system for reservable adventures within designated geographic area;

in response to receiving a resulting set of reservable adventures from the adventure management server system, simultaneously displaying in a graphic interface of the adventure reservation mobile application of the end user mobile device a scrollable list of the resulting set of reservable adventures and an interactive user-adjustable map that depicts one or more location identifiers corresponding to one or more of the reservable adventures of the resulting set within the designated geographic area; and in response to a selection of one of the location identifiers corresponding to one of the resulting set of reservable adventures displayed on the interactive user-adjustable map of the graphic interface of the adventure reservation mobile application of the end user mobile device, automatically scrolling the simultaneously displayed scrollable list of the resulting set of reservable adventures to display a list entry corresponding to said one of the resulting set of reservable adventures displayed on the interactive user-adjustable map, wherein said automatically scrolling to display the list entry comprises displaying, contemporaneously with the interactive user-adjustable map on the graphic interface of the adventure reservation mobile application of the end user mobile device, list entry information including an adventure title, a number of remaining spots available, timeframe information corresponding to said one of the resulting set of reservable adventures, and a price corresponding to said one of the resulting set of reservable adventures.

12. The method of claim 11, further comprising, in response to a selection of said list entry corresponding to said one of the resulting set of reservable adventures displayed on the interactive user-adjustable map of the graphic interface of the adventure reservation mobile application of the end user mobile device, displaying an adventure detail user interface at the graphic interface of the adventure reservation mobile application of the end user mobile device that prompts a user to reserve said one of the resulting set of reservable adventures.

13. The method of claim 11, wherein each of the reservable adventures in the resulting set of reservable adventures from the adventure management server system includes a respective list entry information including at least the adventure title, the number of remaining spots available, the timeframe information, a price, and a skill level.

14. The method of claim 11, wherein the respective list entry information for each of the reservable adventures in the resulting set of reservable adventures from the adventure management server system is corresponds to a respective one of a plurality of independent adventure providers that upload and manage reservable adventures of the adventure management server system.

15. The method of claim 11, wherein the resulting set of reservable adventures from the adventure management server system is filtered based upon at least: location information, dates, and range of costs.

16. The method of claim 11, wherein the designated geographic area includes a proximity to a geographic location of end user mobile device that is automatically detected upon launching the adventure reservation mobile application at the end user mobile device.

* * * * *